United States Patent
Maxwell et al.

(10) Patent No.: US 6,197,851 B1
(45) Date of Patent: Mar. 6, 2001

(54) POLYESTER COMPOSITIONS CONTAINING NEAR INFRARED ABSORBING MATERIALS TO IMPROVE REHEAT

(75) Inventors: Brian Edison Maxwell, Johnson City; Max Allen Weaver, Kingsport; James John Krutak, Sr., Kingsport; William Whitfield Parham, Kingsport; Gerry Foust Rhodes, Piney Flats; Jean Carroll Fleischer, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 08/918,086

(22) Filed: Aug. 25, 1997

Related U.S. Application Data

(60) Provisional application No. 60/024,967, filed on Aug. 30, 1996.

(51) Int. Cl.[7] ........................................ C08K 5/34
(52) U.S. Cl. .............................. 524/88; 524/89; 524/90; 524/91
(58) Field of Search ................... 524/88, 89, 90, 524/91

(56) References Cited

U.S. PATENT DOCUMENTS

| | | | |
|---|---|---|---|
| 4,408,004 | 10/1983 | Pengilly | 524/398 |
| 4,420,581 | 12/1983 | McFarlane et al. | 524/431 |
| 4,476,272 | 10/1984 | Pengilly | 524/398 |
| 4,481,314 | 11/1984 | Rule | 524/88 |
| 4,535,118 | 8/1985 | Pengilly | 524/398 |
| 4,606,859 | 8/1986 | Duggan et al. | 540/122 |
| 5,030,708 | 7/1991 | Krutak et al. | 528/272 |
| 5,039,600 | 8/1991 | Tai et al. | 430/495 |
| 5,419,936 | 5/1995 | Tindale | 428/35.8 |
| 5,529,744 | 6/1996 | Tindale | 264/532 |

FOREIGN PATENT DOCUMENTS

| | | |
|---|---|---|
| 0 204 304 A2 | 12/1986 | (EP) . |
| 0 429 311 A2 | 5/1991 | (EP) . |
| 0 523 959 A2 | 1/1993 | (EP) . |
| 0 607 031 A1 | 1/1994 | (EP) . |
| 0 700 961 A2 | 3/1996 | (EP) . |
| 1537375 | 12/1978 | (GB) . |
| 61-215663 | 9/1986 | (JP) . |

OTHER PUBLICATIONS

A. W. Snow and J. R. Griffith, Macromolecules, 1984, 17 (1614–1624).
J.A.C.S. 1984, 106, 7404–7410.
Zn. Obshch. Khim, 1972, 42(3), 696–9 (CA 77: 141469m).
J. Heterocyclic Chem. 1990, vol. 27, Iss. 7, pp. 2219–2220.
S. Cohen, et al., JACS, 81, 3480 (1959).
R. West, editor, Oxocarbons, Academic Press, New York, 1980, pp. 185–231.
G. Maahs and P. Hagenberg, Angew. Chem. Internat. Edit., vol. 5 (1966), No. 10, p. 888.
A. H. Schmidt, Synthesis, Dec. 1980, p. 961.
Color Chemistry by Heinrich Zollinger, VCH Publishers, 2nd ed.

*Primary Examiner*—Krellion Sanders
(74) *Attorney, Agent, or Firm*—Karen A. Harding; Harry J. Gwinnell

(57) ABSTRACT

The present invention relates to a container preform comprising: a polymer suitable for the production of a stretch blow molded bottle and at least one organic or metallated organic near infrared absorbing compound which absorbs at least twice as much light between about 700 nm and about 1200 nm as between about 400 mn and about 700 nm wherein said near infrared absorbing compound is present in an amount sufficient to improve reheat rate of said preform. Suitable near infrared absorbing compounds include phthalocyanines, 2,3-napthalocyanines, squaraines (squaric acid derivatives), croconic acid derivatives, substituted indanthrones and certain highly substituted anthraquinones. A process for improving the reheat rate of a container preform is also disclosed.

42 Claims, 11 Drawing Sheets

POLYESTER COMPOSITIONS CONTAINING NEAR INFRARED ABSORBING MATERIALS TO IMPROVE REHEAT

RELATED APPLICATION

This application is based upon and claims the priority of provisional application 60/024,967 filed Aug. 30, 1996.

FIELD OF THE INVENTION

Many plastic packages, especially poly(ethylene terephthalate) (PET) beverage bottles, are formed by a process called Reheat Blow Molding (RHB) wherein an injection molded part called a preform or parison is heated by a bank of heat lamps to a critical temperature and then blown to fill a mold. The time required for the parison to reach the critical temperature is known as the reheat time or reheat rate of the material and varies as a function of the absorption characteristics of the polymer itself as well as any additives such as metals, catalysts, toners, dyes, or included foreign matter. As blow molding equipment has improved it has become possible to produce more bottles per hour. Thus it is desirable to provide polyesters which reheat faster or with less energy.

BACKGROUND OF THE INVENTION

The heat lamps used in the beverage bottle industry typically are quartz lamps at a temperature of 3000–4000° F. with a broad emission spectrum from 500 nm to greater than 1500 nm. The emission maximum is around 1100–1200 nm typically. Polyester, especially PET absorbs poorly in the region between 500 and 1400 nm. Since compounds with absorbances in the range of 400–700 nm appeared colored to the human eye, compounds which absorb in this range will impart color to the polymer. Thus to improve the reheat rate of a material, one must increase the absorption of radiation in the region of emission of the heat lamps, preferably in the region of maximum emission. Many methods exist for accomplishing this.

U.S. Pat. Nos. 4,408,004, 4,476,272, 4,535,118, 4,420,581, 5,419,936, and 5,529,744, disclose various gray or black body absorbing compounds which are disclosed to improve reheat rates. Disclosed compounds include finely divided carbon black, iron oxides and antimony metal. All of these compounds are black or gray body absorbers which absorb energy across the whole spectrum of infrared and visible radiation. As a result, these materials all impart a grayness or loss of transparency to the polymer which is in proportion to the amount of material added to the polymer. To some extent, this effect can be controlled by varying the particle size of the additive, but it cannot be eliminated.

U.S. Pat. No. 4,481,314, discloses the use of certain anthraquinone type dyes for the purposes of improving reheat rates. However, these dyes have substantial absorbance in the visible spectrum resulting in coloration of the polymer. In addition, their relatively low molar extinction coefficients ($\epsilon$) (in the range of 20,000) require the use of relatively large amounts of the dye (20–100 ppm) to the polymer. At the level of 50 ppm, the reheat rate improvement was 7%. However, at these levels the polymer displays a light green color which is not suitable for producing clear bottle polymer resin.

DETAILED DESCRIPTION OF THE INVENTION

Figure 1:
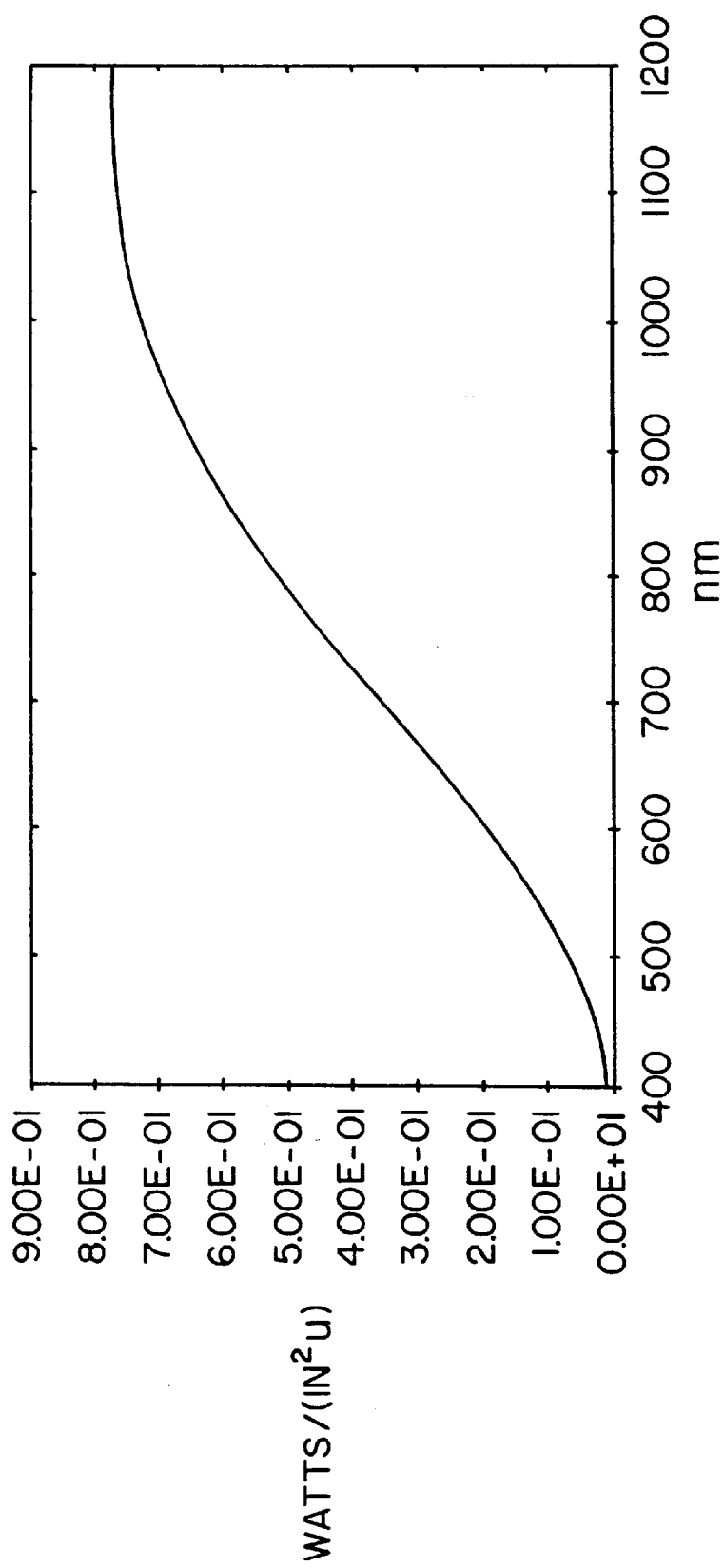
FIG. 1 is a graph of the emission of a black body lamp.

The present invention is related to polyester compositions displaying reduced reheat times or increased reheat rates comprising small amounts of at least one organic or metallated organic near infrared absorbing compound(s) to be referred to as reheat aids herein.

Suitable reheat aids useful in the practice of the invention absorb strongly in the non-visible regions of light emitted by the lamp and have only minimal absorbance in the range visible to the human eye. Preferably the reheat aids of the present invention possess absorption spectra wherein the area under the near infrared portion of the curve is at least about twice as large as the area under the visible portion of the curve. More preferably the area under the absorption spectra curve between 700 and 1200 nm is at least about twice the area under the curve between 400 and 700 nm.

The reheat aid should not have any strong absorbance peaks in the visible region of the spectrum as this would add color to the bottle resin. If the absorbance maximum in the near infrared spectrum is adjusted such that its absorbance is about 0.4 to about 0.5 absorbance units in the spectrum, then no absorbance in the visible region should exceed about 0.2 absorbance units. Preferably, no absorbance in the visible should be greater than about 0.15 when the absorbance maximum in the near infrared is between about 0.4 and about 0.5 absorbance units.

Reheat aids of the present invention should also possess a high molar extinction coefficient (strong absorbance characteristics). A molar extinction coefficient ($\epsilon$) greater than about 25000 L/mol is preferred, while $\epsilon$ of greater than about 50000 L/mol is more preferred. In the absence of a known molecular weight such as when a reheat aid is a mixture of components, an absorptivity (a) may be used where the absorbance is related to the concentration of a solution in grams per liter. Assuming a path length for the cell of 1 cm, it is preferred that a is at least about 20 L/g; preferably a is at least about 30 L/g and more preferably a is at least about 35 L/g being most preferred.

The visual or optical properties of PET containers are critical. Additives which substantially decrease the clarity or impart undesirable color are not acceptable. Accordingly, the reheat aids of the present invention have only a minimal effect on the clarity and color of the polymer. Polymer containing the reheat aids of the present invention generally display improved reheat without reducing the L* of a 3"×3"×0.15" molded plaque by more than 4 units compared to a plaque containing no reheat aid. Preferably, the reheat aid will not reduce L* by more than 3 units for a 10% improvement. Most preferably, the reheat aid will not reduce L* by more than 2 units for a 10% improvement in reheat rate.

The reheat aids of the present invention are either blended into molten polymer or added into the polymerization at a suitable location. Accordingly the reheat aids must be able to withstand the temperature and chemical environment during polymerization or molding. This typically requires the ability to withstand temperatures in the range of about 275 to about 300° C. for periods from about 5 minutes to about 7 hours depending on the method employed to blend the aid with the resin. In extrusion blending operations, the residence time would be in the range of about 5 to about 15 minutes. In cases where the aid is added during the polymerization process, the requirements are more stringent and can exceed a total of up to about seven hours residence time. Stability in this context is defined as surviving the blending and bottle molding process with the light absorbing characteristics of the molecule unchanged and without substantial loss of the molecule due to sublimation or evaporation.

It is also within the scope of the invention to improve the reheat rate of a resin through the addition of two or more reheat aids, said reheat aids having been chosen so that their absorption characteristics result in a broader, stronger absorbance in the near infrared region, with little or no increase in absorbance in the visible region of the spectrum. Moreover, it should be appreciated that mixtures of reheat aids may include mixtures of the organic or metallated organic near infrared absorbing compound(s) which are disclosed herein as well as mixtures of organic or metallated organic near infrared absorbing compound(s) and black or gray body type absorbing materials.

The preferred organic or metallated organic near infrared absorbing compound(s) which are useful in the practice of this invention are selected from the classes of phthalocyanines, 2,3-naphthalocyanines, squaraines (squaric acid derivatives), croconic acid derivatives, substituted indanthrones and certain highly substituted anthraquinones and correspond to Formulae I, II, III, IV, V, and VIa & b respectively:

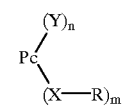

I

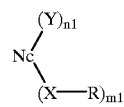

II

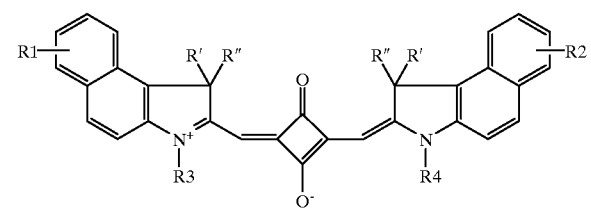

III

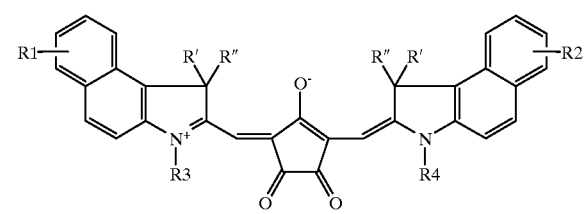

IV

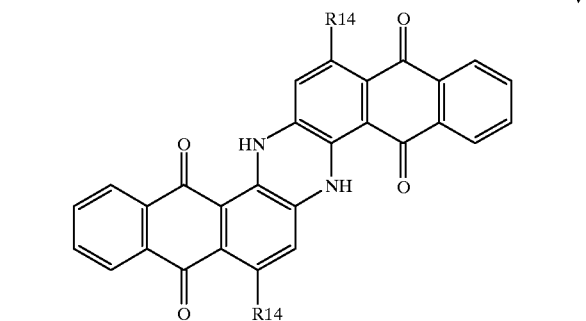

V

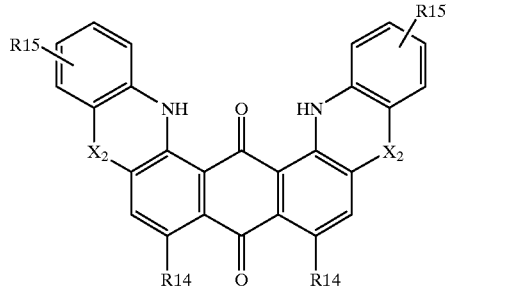

VIa

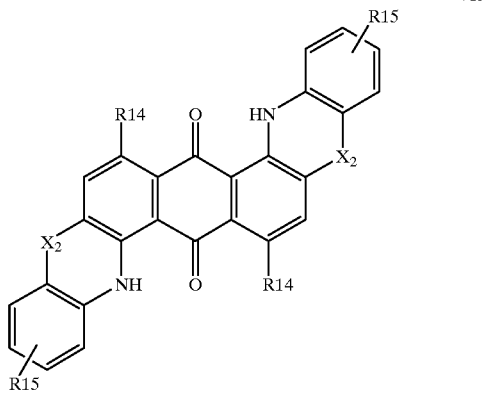

VIb wherein Pc and Nc represent the phthalocyanine and naphthalocyanine moieties of Formulae Ia and IIa

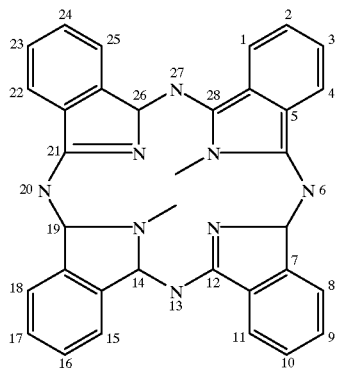

Formula Ia

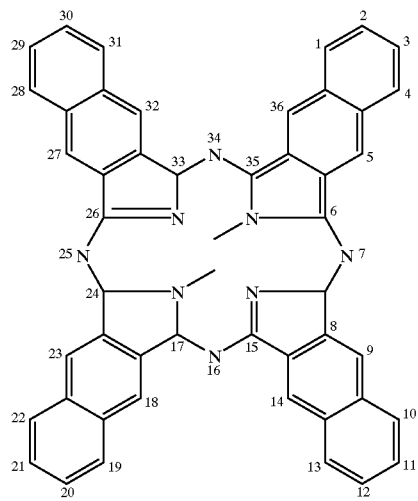

Formula IIa wherein said phthalocyanine and naphthalocyanine compounds are respectively, covalently bonded to a moiety selected from hydrogen, various halometals, organometallic groups, and oxymetals. Preferably said moiety is selected from AlCl, AlBr, AlF, AlOR$_5$, AlSR$_5$, SiCl$_2$, SiF$_2$, Si(OR$_6$)$_2$, Si(SR$_6$)$_2$, Zn, Mg, VO, Cu, Ni, Fe, Mg, Mn, Co, Ge, Ge(OR$_6$), Ga, Ca, CrF, InCl, Pb, Pt, Pd, SnCl$_2$, Sn(OR$_6$)$_2$, Si(OR$_6$)$_2$, Sn, or TiO wherein R$_5$ and R$_6$ are selected from hydrogen, alkyl, aryl, heteroaryl, alkanoyl, arylcarbonyl, arylaminocarbonyl, trifluoroacetyl

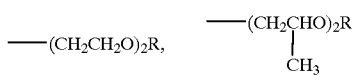

groups of the formula

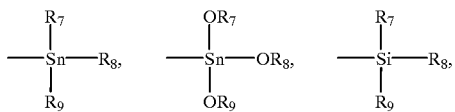

-continued

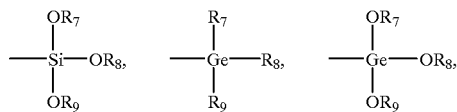

wherein R$_7$, R$_8$ and R$_9$ are independently selected from alkyl, phenyl or phenyl substituted with alkyl, alkoxy or halogen. More preferably said moiety is selected from VO, Cu, Ni, Fe, Mg, Mn, Co, Ge, Ge(OR$_6$), Ga, Ca, CrF, InCl, Pb, Pt, Pd, SnCl$_2$, Sn(OR$_6$)$_2$, Si(OR$_6$)$_2$, Sn, or TiO and most preferably VO, Cu, Ni, Fe and Mg, wherein R$_6$ is as defined above.

The substituents X—R and Y are bonded to the periphery of the phthalocyanine and naphthalocyanine compounds. In the definitions of the substituents (Y)n, (Y)n$_1$, —(X—R)m and (—X—R)m$_1$ these substituents are not present when n, n$_1$, m and m$_1$ are zero, respectively (ie. the phthalocyanine or naphthalocyanine is unsubstituted). Substituents (X—R)m and (Y)n are present in compounds Ia on the peripheral carbon atoms, i.e. in positions 1, 2, 3, 4, 8, 9,10, 11, 15, 16, 17, 18, 22, 23, 24, 25 and substituents (X—R)m$_1$ and (Y)n$_1$ are present on the peripheral carbon atoms of IIa, i.e. in positions 1, 2, 3, 4, 5, 9, 10, 11, 12, 13, 14, 18, 19, 20, 21, 22, 23, 27, 28, 29, 30, 31, 32 and 36.

The substituent Y may be the same or different and is selected from alkyl, aryl, heteroaryl, halogen or hydrogen.

The substituent X may be the same or different and is selected from oxygen, sulfur, selenium, tellurium or a group of the formula N—R$_{10}$, wherein R$_{10}$ is hydrogen, cycloalkyl, alkyl, alkanoyloxy, alkylsulfonyl, or aryl or R$_{10}$ and R taken together form an aliphatic or aromatic ring with the nitrogen atom to which they are attached.

R is selected from hydrogen, alkyl, alkenyl, alkynyl, cycloalkyl, aryl, heteroaryl, alkylene;

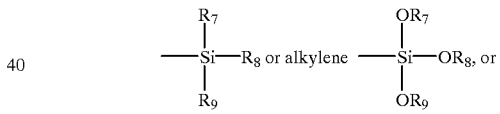

—(X—R)$_m$ or —(X—R)$_{m1}$ is one or more groups selected from alkylsulfonylamino, arylsulfonylamino, or a group selected from the formulae —X(C$_2$H$_4$O)$_z$R$_1$

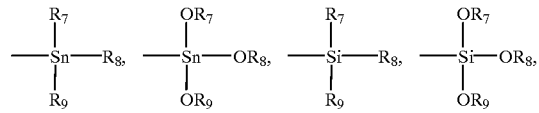

wherein R is as defined above; Z is an integer of from 1–4; or two —(X—R)$_m$ or —(X—R)$_{m1}$ groups can be taken together to form divalent substituents of the formula

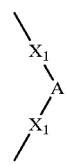

wherein each X$_1$ is independently selected from —O—, —S—, or —N—R$_{10}$ and A is selected from ethylene;

propylene; trimethylene; and such groups substituted with lower alkyl, lower alkoxy, aryl and cycloalkyl; 1,2-phenylene and 1,2-phenylene containing 1–3 substituents selected from lower alkyl, lower alkoxy, carboxy, alkoxycarbonyl or halogen; R' and R" are independently selected from lower alkyl and cycloalkyl; n is an integer from 0–16; $n_1$ is an integer from 0–24, m is an integer from 0–16; $m_1$ is an integer from 0–24; provided that the sums of n+m and $n_1+m_1$ are 16 and 24, respectively.

In the squaric acids of formula III and the croconic acids of formula IV $R_1$ and $R_2$ are independently selected from hydrogen, alkyl, alkoxy, halogen, aryloxy, alkylthio, arylthio, alkylsulfonyl, arylsulfonyl, alkyl sulfonylamino, arylsulfonylamino, cycloalkylsulfonylamino, unsubstituted and substituted carbamoyl and sulfamoyl, alkoxycarbonyl, cycloalkoxycarbonyl, alkanoyloxy,

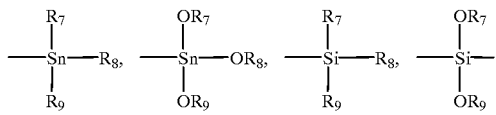

$R_3$ and $R_4$ are independently selected from hydrogen, lower alkyl, alkenyl or aryl; n is an integer from 0–16; $n_1$ is an integer from 0–24, m is an integer from 0–16; $m_1$ is an integer from 0–24; provided that the sums of n+m and $n_1+m_1$ are 16 and 24, respectively.

For compounds V, VIa and VIb the substituent $R_{14}$ is independently selected from hydroxy, alkylamino, arylamino, heteroarylthio, arylthio or alkylthio; $R_{15}$ is selected from hydrogen, alkyl, alkoxy, halogen, aryloxy, alkylthio, arylthio, alkanoylamino, alkylsulfonyl, arylsulfonyl, trifluoromethyl, cycloalkylamino, alkylamino, arylamino, alkylsulfonylamino, aroylamino, arylsulfonylamino, cycloalkylsulfonylamino, carbamoyl, sulfamoyl, alkoxycarbonyl, cycloalkoxycarbonyl, alkanoyloxy, and carboxy, and $X_2$ is independently selected from O, S, $SO_2$ and NH.

In the above definitions, the terms "alkyl" and "lower alkyl" are used to designate saturated hydrocarbon radicals containing 1–12 and 1–6 carbons; respectively, and these substituted with one or more groups selected from hydroxy, halogen, alkoxy, aryloxy, alkanoyloxy, carboxy, alkoxycarbonyl, aryl, cycloalkyl and cyano.

In the terms "alkoxy", "alkylsulfonyl", "alkylsulfonylamino", "alkylthio", "alkoxycarbonyl", "alkanoyl", "alkanoylamino", "alkanoxyloxy" and "alkylamino". The alkyl portion of the group contains 1–12 carbons and may be substituted as described above.

In the terms "cycloalkyl", "cycloalkylamino", "cycloalkylsulfonylamino" and "cycloalkoxycarbonyl", the cycloalkyl portion of the group contains 3–8 carbons and may be further substituted with lower alkyl or halogen.

The terms "alkenyl" and "alkynyl" are used to denote unsaturated, aliphatic hydrocarbon moieties having 3–8 carbons and containing at least one carbon-carbon double bond and one carbon-carbon triple bond, respectively.

The term "halogen" is used to include fluorine, chlorine, bromine and iodine.

The term "alkylene" is used to denote a straight or branched chain divalent hydrocarbon radical containing 1–12 carbons and which may be further substituted with one or more groups selected from halogen, lower alkoxyl, alkanoyloxy, aryl and cycloalkyl.

In the terms "aryl", "arylthio", "aryloxy", "aroyl", "arylcarbonyl", "arylaminocarbonyl", "arylsulfonylamino", "arylsulfonyl" and arylamino", the aromatic portion of the group includes radicals containing 6–18 carbons, preferably phenyl and naphthyl, and such radicals substituted with one or more groups selected from alkyl, alkoxy, carboxy, halogen, alkylthio, alkylamino, dialkylamino, trifuloromethyl, carboxy, alkoxycarobonyl, hydroxy, alkanoyloxy, alkanoylamino, alkylsulfonylamino, arylsulfonylamino, cycloalkylsulfonylamino, cyano, phenyl, phenylthio, phenylsultonyl phenoxy, sulfamoyl and carbamoyl.

The term "heteroaryl" is used to represent mono or bicyclic hetero aromatic radicals containing at least one "hetero" atom selected from oxygen, sulfur and nitrogen or a combination of these atoms. Examples of suitable heteroaryl groups include: tyhiazoyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl includes the structure

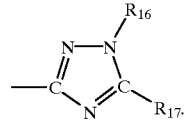

Wherein $R_{16}$ and $R_{17}$ are independently selected from alkyl, aryl, cycloalkyl and hydrogen.

The terms "carbamonyl" and "sulfamoyl" are used to describe radicals having the formulae —$CON(R_{18})R_{19}$ and, —$SO_2N(R_{18})R_{19}$, respectively, wherein $R_{18}$ and $R_{19}$ are independently selected from hydrogen, alkyl, cycloalkyl and aryl.

In a preferred embodiment of this invention, the reheat aid is a mixture of phthalocyanine compounds of Formula I, wherein the substituents on the phthalocyanine moiety are attached at the outer ring positions (i.e. the 2, 3, 9, 10, 16, 17, 23, and 24 positions).

In a further preferred embodiment of this invention the reheat aid is a mixture of phthalocyanine compounds of Formula I, wherein X is N, R is aryl or alkyl, Y is F, m is 5–8, n is 8–11; and wherein the phthalocyanine moiety is bonded to (at the 29 and 31 positions) to Cu or V=O.

In a further preferred embodiment of this invention the reheat aid is a mixture of phthalocyanine compounds of Formula I, wherein X is N, R is aryl or alkyl, Y is Cl, m is 5–8, n is 8–11; and wherein the phthalocyanine moiety is bonded to (at the 29 and 31 positions) to Cu or V=O.

In a further preferred embodiment of this invention the reheat aid is a mixture of phthalocyanine compounds of Formula I, wherein at least two X—R groups are combined to produce at least one divalent substituent of the formula

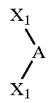

Wherein one $X_1$ represents —N—($R_{10}$)— and the other —S—, A is 1,2-phenylene and 1,2 phenylene substituted with carboxy, carbalkoxy, hydroxy alkyl, hydorxyalkoxy, hydroxyalkylthio, carboxyalkyl, carbalkoxyalkyl; $R_{10}$ is hydrogen or alkyl Y is Cl, m is 4–8, n is 8–12; and wherein the phthalocyanine moiety is bonded to (at the 29 and 31 positions) to Cu or V=O.

In a further preferred embodiment of this invention, the reheat aid is an anthraquinone compound of Formula VIa or VIb, wherein $R_{14}$ is arylamino.

Two general routes are available for the synthesis of the NIRF compounds of Formula I. Route 1 involves the reaction of substituted phthalonitriles VI containing one or more leaving groups Z with one or more nucleophiles VII (A. W. Snow and J. R. Griffith, Macromolecules, 1984, 17 (1614–1624), in the presence of a high boiling polar solvent such as N,N-dimethylformamide, N,N-dimethylacetamide, N-methyl-2-pyrrolidinone, tetramethylurea, and hexamethylphosphotriamide to give intermediates VIII, which are further reacted by known procedures to give compounds I directly in a one-pot process or to give the isoindoline derivatives IX, which are converted into the desired phthalocyanines I by known processes.

Route 1

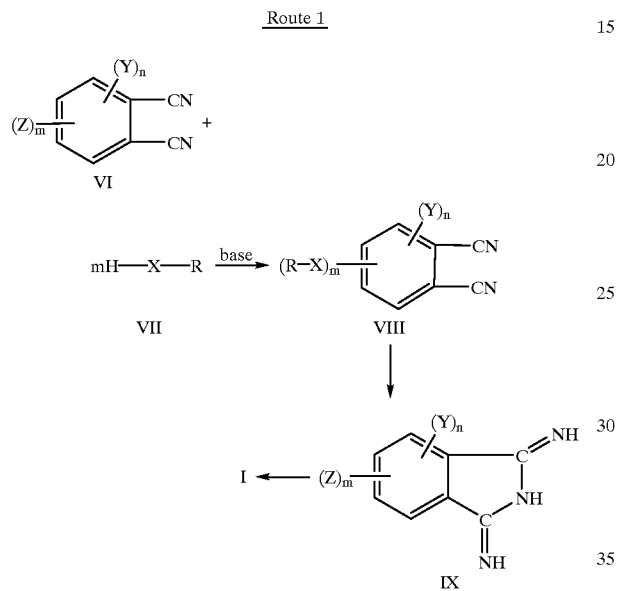

Of course, the starting compounds VI may contain further substituents which are not replaced by reaction with the nucleophile. Route 2 employs similar reaction conditions, as involved in initial step of Route 1, and makes use of the reactivity of the halogen atoms in polyhalo phthalocyanines $X_1$ containing 4–16 halogen atoms attached at peripheral carbon atoms, with nucleophiles VII (see U.K. Patent No. 1,537,375 and U.S. Pat. No.4,606,859) to give NIRF compounds I.

Route 2

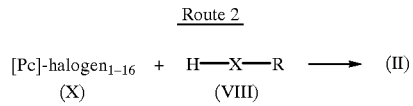

In the above nucleophilic reactions utilized in Routes 1 and 2, the base, or acid binding agent, may be an alkali metal hydroxide, an alkali metal bicarbonate or an alkali metal carbonate. For example, sodium carbonate, potassium carbonate, lithium hydroxide, sodium hydroxide, sodium bicarbonate and suitable bases.

The 2,3-naphthalocyanines of Formula II can be prepared by reacting 2,3-naphthalene-dicarbonitrile compounds XI to give 1,3-diiminobenz[f]-isoindolines XII, which are then converted to the naphthalocyanines of Formulae II by known procedures [J.A.C.S. 1984, 106, 7404–7410; U.S. Pat. No. 5,039,600, incorporated herein by reference; Zn. Obshch. Khim, 1972, 42(3), 696–9 (CA 77: 141469m); and Jap. Pat. 61,215,663 (CA 106: 86223s)].

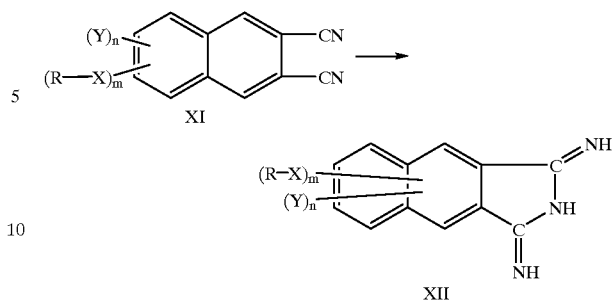

Intermediate compounds XI which contain one or more electron donating groups (—X—R) are conveniently prepared by reacting intermediate 2,3-naphthalenecarbonitriles XIII containing replaceable halogens with one or more nucleophiles under reaction conditions which favor nucleophilic displacements (J.Heterocyclic Chem. 1990, Vol.27, Iss. 7, pp 2219–20) as follows:

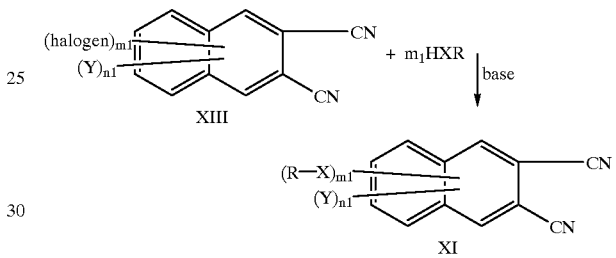

The squaraines of Formula III can be prepared by reacting the corresponding unsubstituted and substituted 1,3-dihydro-2-methylene-1,1-dimethyl-1H-benz[e]indoles with squaric acid [S. Cohen, et al., JACS, 81, 3480 (1959)]. The reactions of squaric acid are well known in the art [R. West, editor, OXOCARBONS, Academic Press, New York, 1980, pp 185–231; G. Maahs and P. Hagenberg, Angew. Chem. internat. Edit., Vol. 5 (1966), No. 10, p 888; A. H. Schmidt, Synthesis, December 1980, p, 961]. The intermediate 1,3-dihydro-2-methylene-1,1-dimethyl-1H-benz[e]indoles XIV can be synthesized by known procedures [U.S. Pat. No. 5,030,708, incorporated herein by reference]. The synthetic route is illustrated as follows:

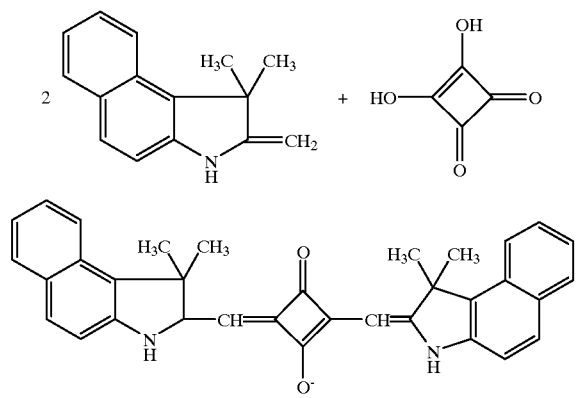

Intermediate 1,3-dihydro-2-methylene-1,1-dimethyl-H-benz[e] indoles XIV are reacted with squaric acid XV as shown to produce the squaraines. Of course, an unsymmetrical derivative is obtained as one of the components of the mixture prepared by reacting a mixture of two or more different intermediate benz[e]indole compounds XIV with squaric acid.

Croconic acid derivatives IV are prepared by the same procedure as the squaraines, except that croconic acid is used instead of squaric acid.

The synthetic route to the indanthrone reheat aid of Formula V is:

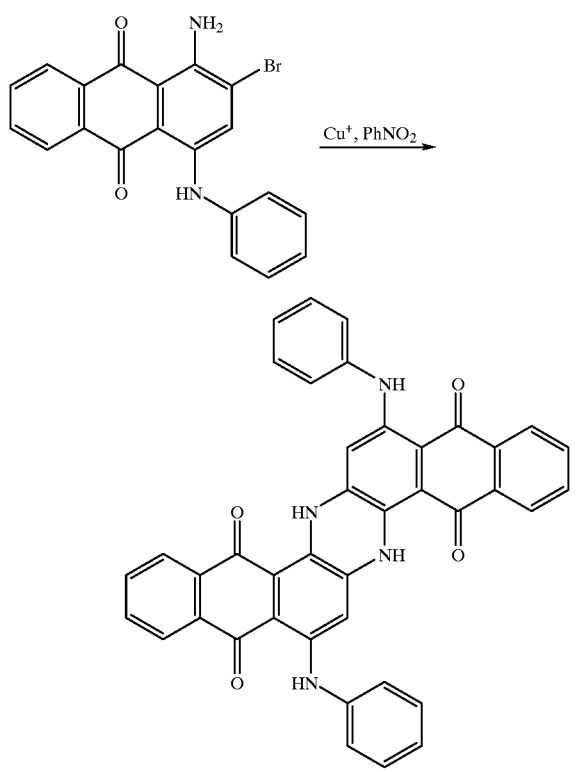

The synthetic route to the anthraquinone reheat aid of Formula VIb is illustrated as follows:

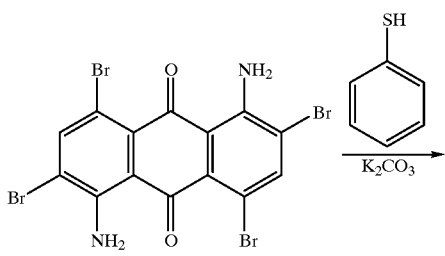

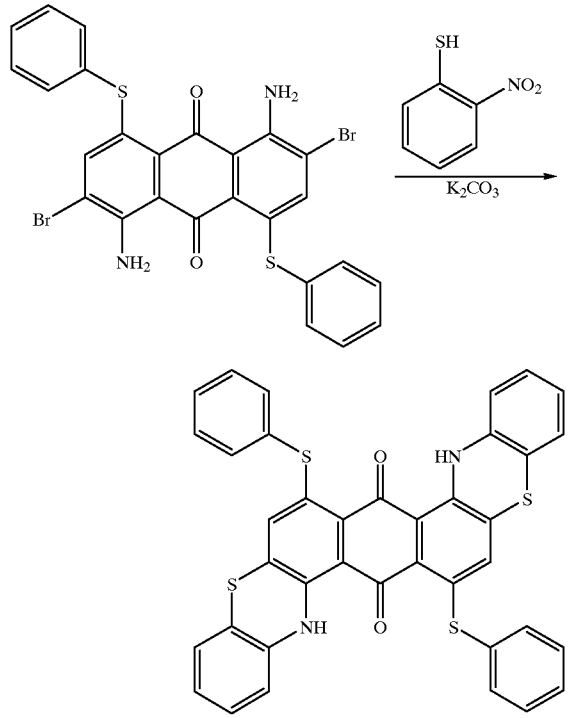

Compounds of formula VIa are prepared similarly by starting with the corresponding 1,8-diamino-2,4,5,7-terrabromoanthraquinone.

Examples of suitable reheat compounds for use in this invention are given in Table 1. The effectiveness of these materials is summarized in Table 2.

It can be seen from an inspection of Table 2 that the effectiveness of the reheat aids of the present invention varies considerably even among members of the phthalocyanine class of dyes. In most cases, the differences in effectiveness are related to the spectral characteristics of the reheat aid (see FIG. 2). There is a strong correlation between the strength of the absorbance in the near infrared region and the reheat rate improvement because the majority of the energy output of the lamps used in the reheat blow molding process is in the near infrared region of the spectrum (see FIG. 1).

TABLE 1
| Reheat Aid | Reference | Structure |
|---|---|---|
| 1 | Nippon Shokubai Excolor 803K | 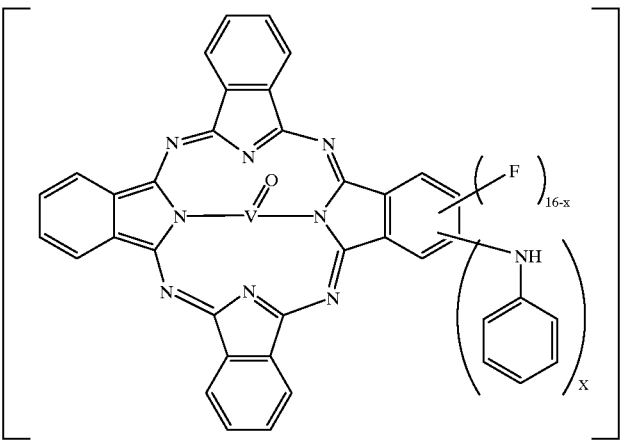<br>Cpd 1<br>x = 4–8 |
| 2 | X193 | 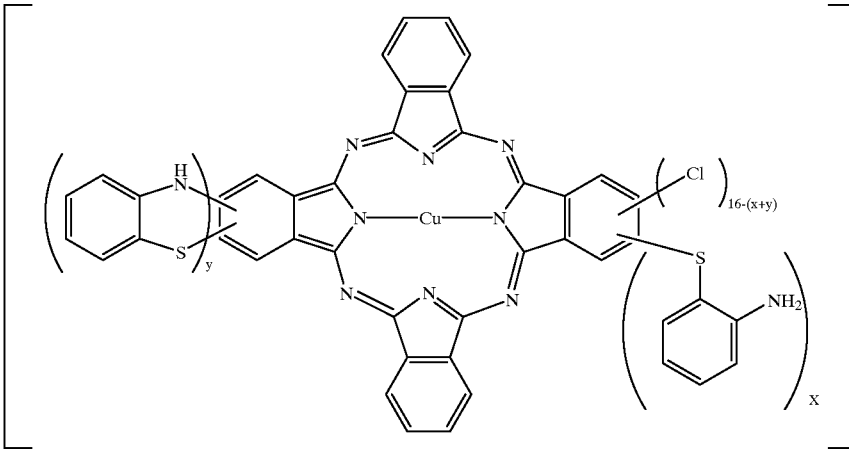<br>Cpd 2<br>x + y = 3–8 |

TABLE 1-continued

| Reheat Aid | Reference | Structure |
|---|---|---|
| 3 | X92 | Cpd 3 |
| 4 | X35 | Cpd 4 |

TABLE 1-continued
| Reheat Aid | Reference | Structure |
|---|---|---|
| 5 | X117 | 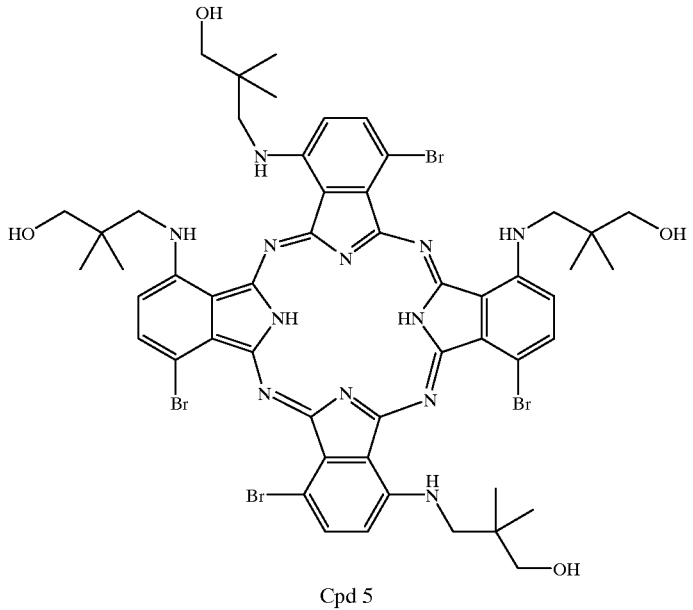Cpd 5 |
| 6 | X87 | 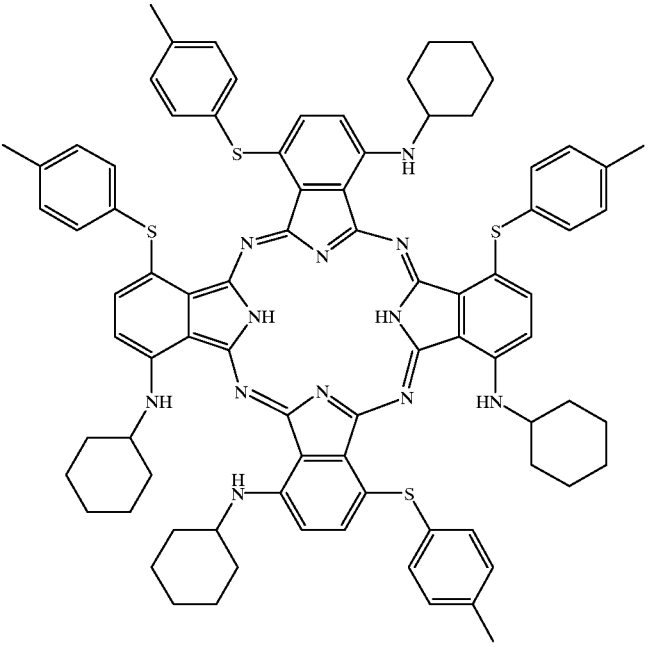Cpd 6 |

TABLE 1-continued

| Reheat Aid | Reference | Structure |
|---|---|---|
| 7 | X50 | 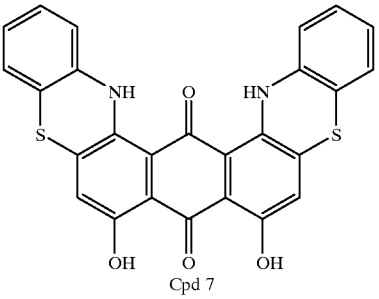<br>Cpd 7 |
| 8 | X130 | 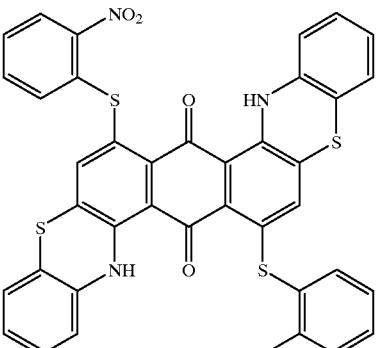<br>Cpd 8 |
| 9 | X131 | 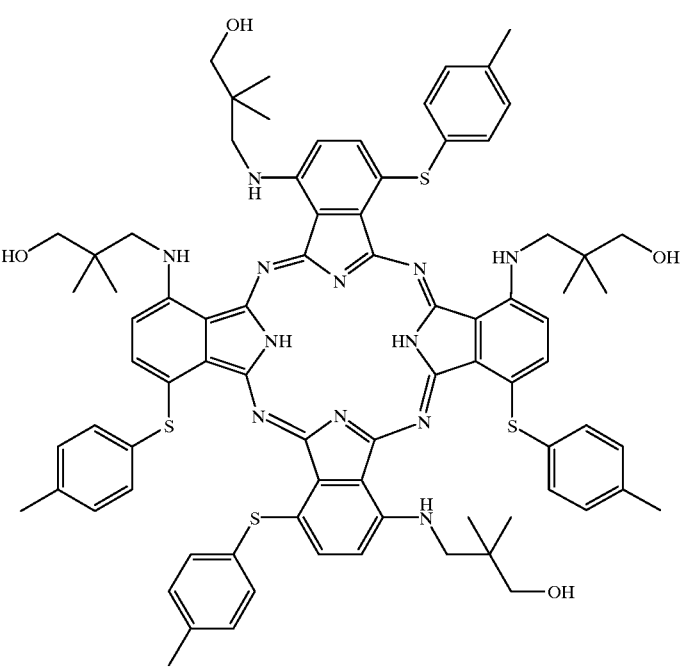<br>Cpd 9 |
| 10 | Nippon Shokubai Excolor 901B | Exact Structure Not Known (mixture) |

Unfortunately a strong absorbance peak in the near infrared region is not a guarantee that a particular compound will act as a good reheat enhancer for polyester containers. Many of the compounds displaying good absorbance in the near infrared region also display significant absorbance peaks in the visible region which results in discoloration or reduced clarity of the resin. Also, because the near infrared absorbance peak of many single compounds is relatively narrow compared to the lamp output, amounts of the organic or metallated organic near infrared absorbing compounds in excess of about 5 ppm are preferred to provide the desired increase in reheat. However, increasing the concentration of the reheat aid increases absorbance in both the near infrared and visible regions, frequently to a level which is detectible by the human eye.

Figure 2:
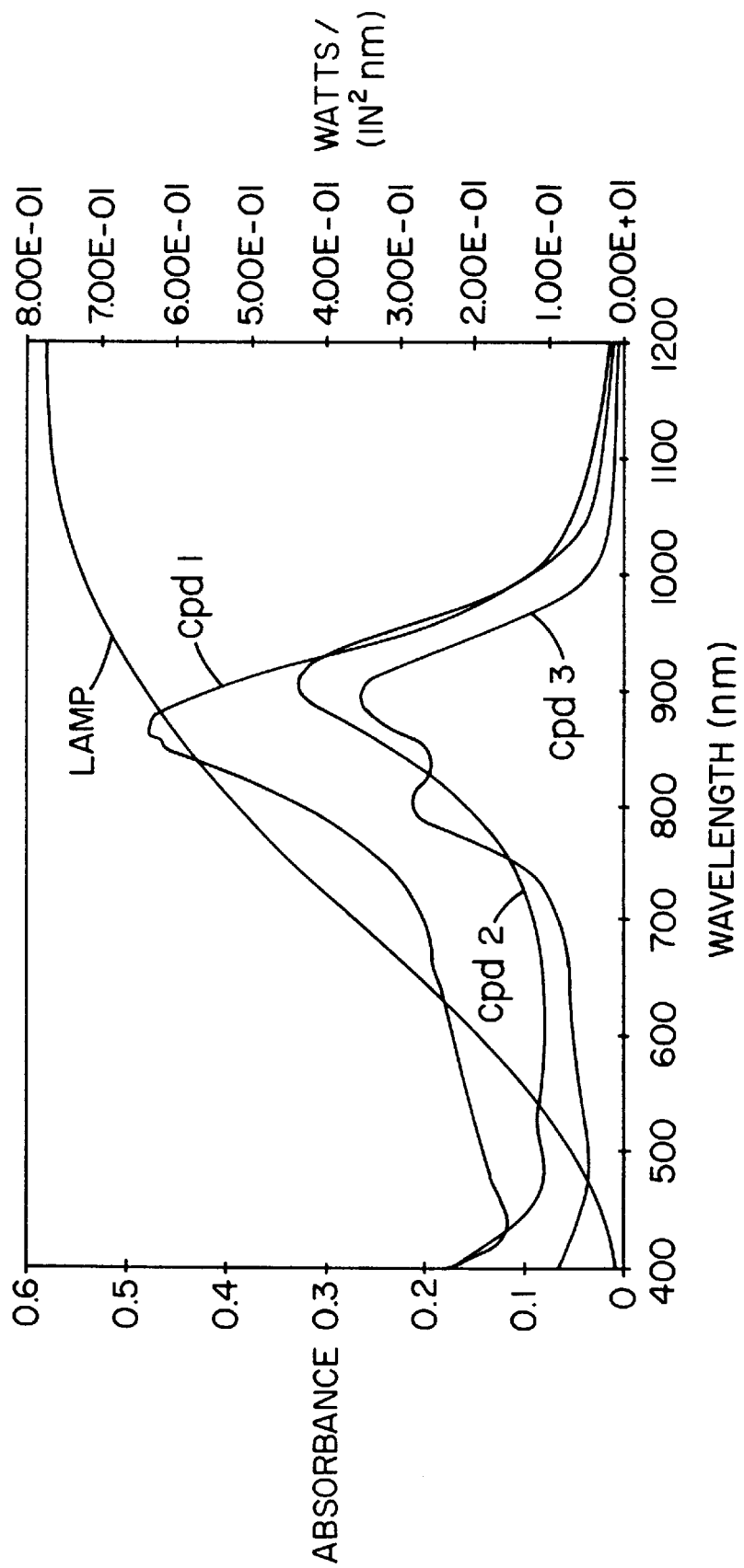
FIG. 2 is a graph of the absorbance spectra for three different organic near infrared absorbing compounds superimposed over the emission of a black body reheat lamp.
Figure 8:
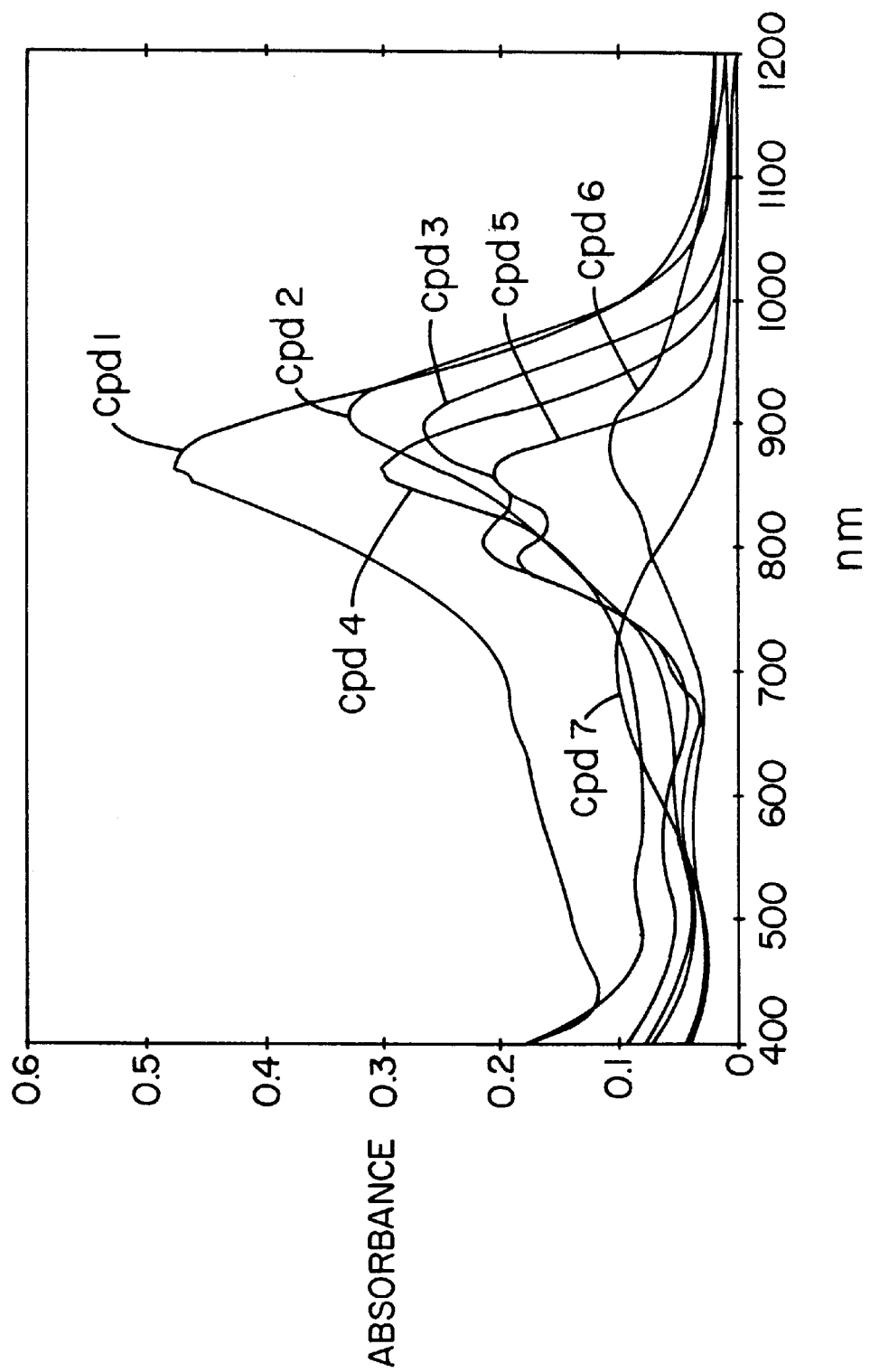
FIG. 8 is the absorbance spectra as measured in solvent, for compounds 1–7.

In FIG. 2, it can be seen that compound 1 (which is a mixture of several phthalocyanine compounds) has both the strongest absorbance across the near infrared region of the reheat aids represented and the highest percentage increase in reheat rate (Table 2, below). Similarly, compound 2 (also a mixture of phthalocyanine compounds) has the second highest absorbance and the second highest reheat rate. FIG. 2 shows the spectra for reheat aids compared against the spectra for a reheat lamp. FIG. 8 shows the spectra for compounds 1 through 7.

TABLE 2

| Reheat Aid | 4 ppm | | 8 ppm | | Thermal Stability |
|---|---|---|---|---|---|
| | % Increase in Reheat Rate | $\Delta L^*$† | % Increase in Reheat Rate | $\Delta L^*$† | |
| 1 | 9.8 | 0.86 | 17.0 | 4.5 | Good |
| 2 | 6.2 | 0.45 | 12.2 | 3.6 | Good |
| 3 | 2.0 | −0.32 | 4 | 1.9 | Poor |
| 4 | 4.9 | 0.14 | 6.6 | 1.7 | Good |
| 5 | 0.5 | 0.83 | 3.0 | 2.8 | Poor |
| 6 | 3.1 | −0.67 | 6.5 | 0 | Good |
| 7 | 4.2 | 0.42 | 6.5 | 2.9 | Good |
| 8 | 5.7 | 2.59 | 6.7 | 5.4 | Good |
| 9 | 3.3 | 1.07 | 7.4 | 2.8 | Good |
| 10 | 6.0 | 1.8 | 11.6 | 5.2 | Good |

†This is the decrease in the L* value compared to a control containing none of the reheat aid.

However, in two cases (i.e. compounds 3 and 5), the spectral data indicated stronger performance than was realized in the polymer sample. In both of these cases, thermal stability was determined to be a problem. The polymer preparation in both cases was observed to undergo a discoration and a loss of a colored material during the polymerization process. This behavior is typical of a thermally unstable dye decomposing.

The impact of the reheat aids on the clarity of the resin can be Judged using the CIE color standard L* value. The L* value in this case is a measure of the apparent transparency of the molded plaque. L* values are a measure of the human eye's perception of brightness. An L* of 100 would be perfectly transparent, while an L* of 0 would be opaque. Reference is made to the apparent transparency, since L* is calibrated to respond as the human eye would respond. For a good description of the CIE color standard, see Color Chemistry by Heinrich Zollinger, VCH Publishers, $2^{nd}$ ed.

Figure 3:
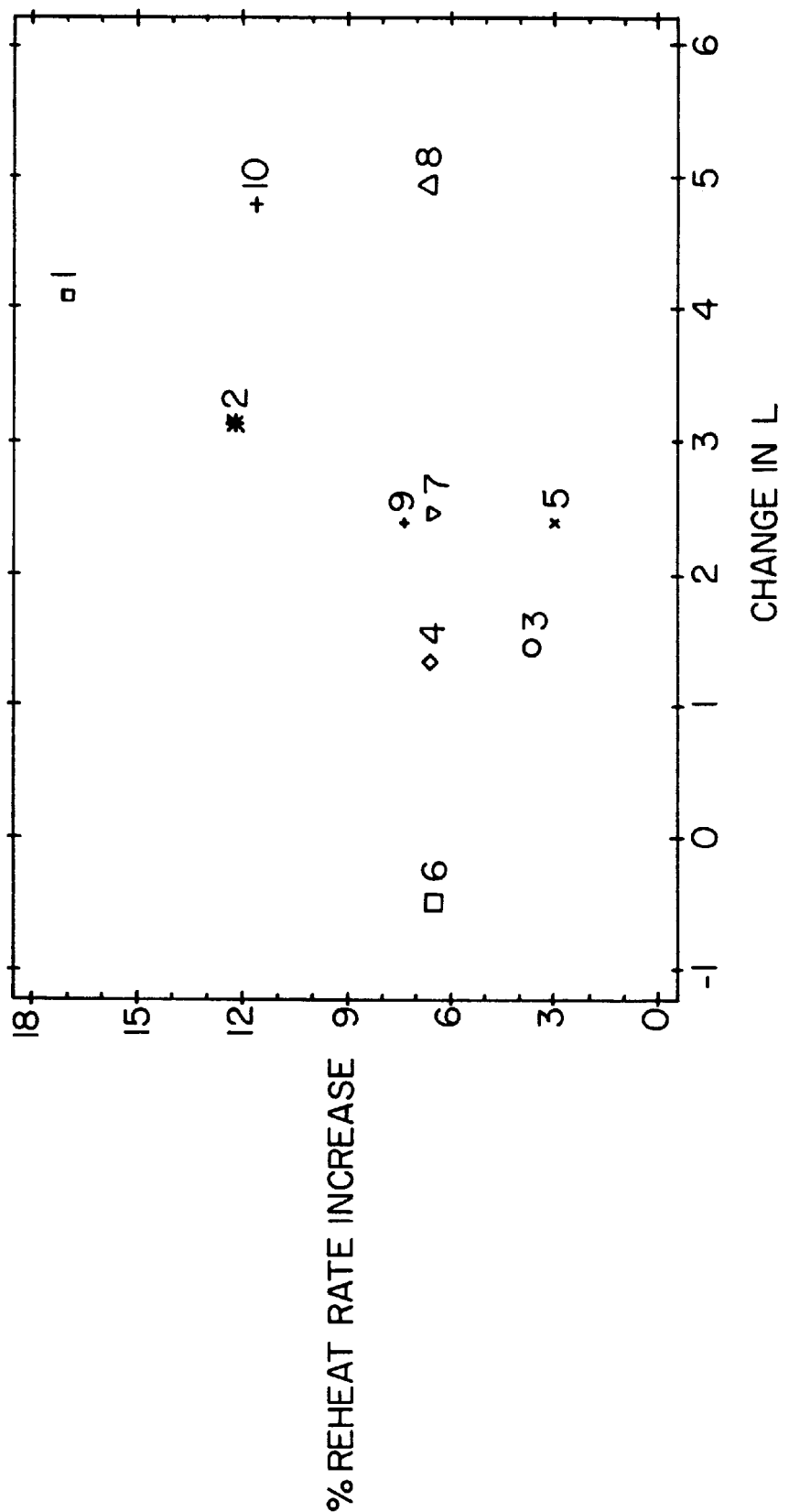
FIG. 3 is a graph showing the % reheat rate increase and change in L* for 10 different organic near infrared absorbing compounds at 8 ppm.
Figure 4:
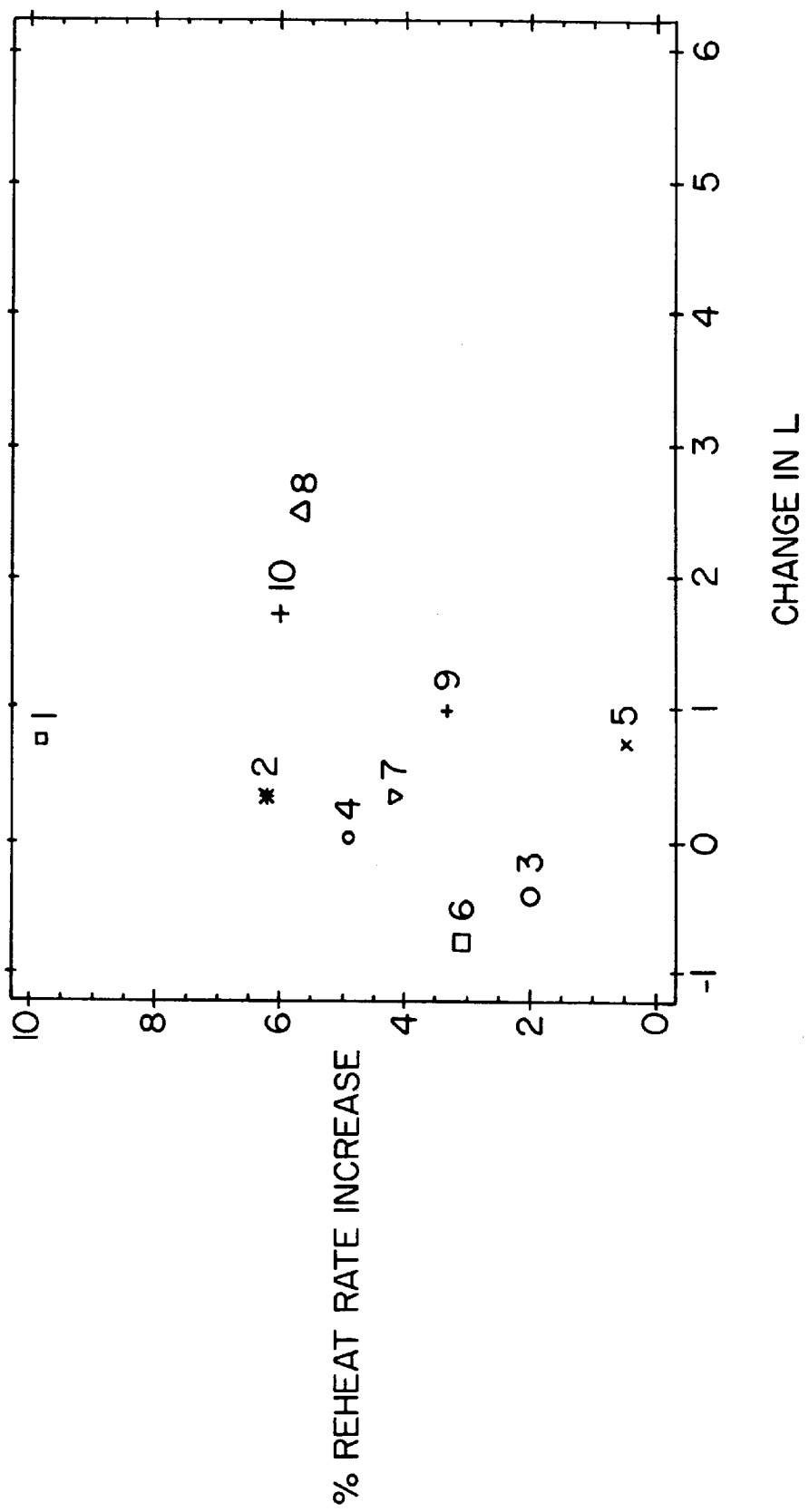
FIG. 4 is a graph showing the % reheat rate increase and change in L* for 10 different organic near infrared absorbing compounds at 4 ppm.

In polyester containers the effect of the reheat aids on the clarity of the molded article is critical. A change in L* of more than 2 units is highly undesirable. The change in L* for the resin samples containing the reheat aids was measured and is summarized in Table 2. FIGS. 3 & 4 show the effect of the reheat aids on the L* of the polymer as a function of concentration. Most of the reheat aids had little or no effect on L* or reheat at 4 ppm (with the exception of compound 1). While the more efficient reheat aids had a pronounced effect at 8 ppm, the negative changes in L* were also augmented.

Mixtures of reheat aids are preferred. As noted in Table 1, compounds 1, 2 and 10 are mixtures. As can be seen from FIGS. 3 and 4 compounds 1, 2 and 10 have significantly better reheat (especially at 8 ppm) than the single compound reheat aids (compounds 3–7 and 9). By creating reheat aids which are mixtures the absorbance band can be broadened to absorb over a greater range of the lamp thereby providing improved reheat. Moreover, it has been surprisingly found that when at least two appropriately selected reheat aids are mixed the effects of absorbance in the visible region is not strictly additive while the effects of absorbance in the near infrared region are.

Preferably the mixture is made from reheat aids having complimentary absorbance spectrum in the visible region. For the purposes of this application complimentary means that the reheat compounds display visible absorbance in different portions of the visible region. For example, if one compound displays moderate absorbance at 500 nm and very weak absorbance in the 600–700 nm region a complimentary component would display no or weak absorbance in the 500 nm range and up to moderate absorbance in the 600–700 nm range. When added together, the overall increase in absorbance in this region is less than would be expected by doubling either of the aids themselves. Mixtures formed in this way display surprisingly good visual properties when used with polyesters.

The basis for the surprisingly good visual properties is not fully understood. However, it is believed to be related to the "qualitatitve" way the human eye perceives color at low absorbance levels. The human eye is especially sensitive to light in the region around 550–650 nm. As a result, small changes in this region of the spectrum can be magnified by the eye thereby giving the impression of a lighter or darker appearance. Moreover, it is well known that the absorption of a compound can shift depending upon the medium it is in.

Figure 9:
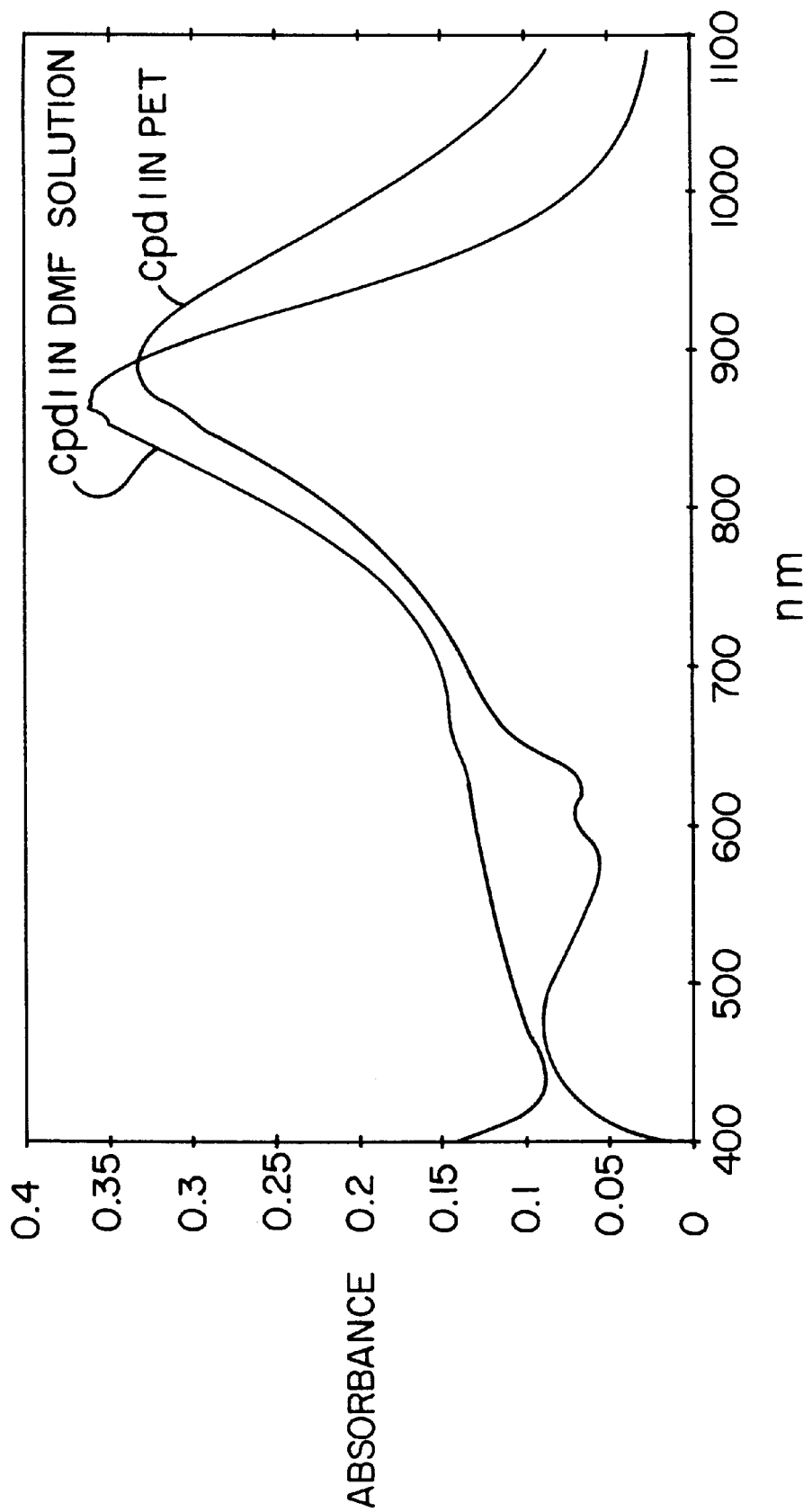
FIG. 9 is the absorbance spectra for compound 2 as measured in DMF solution and PET.
Figure 10:
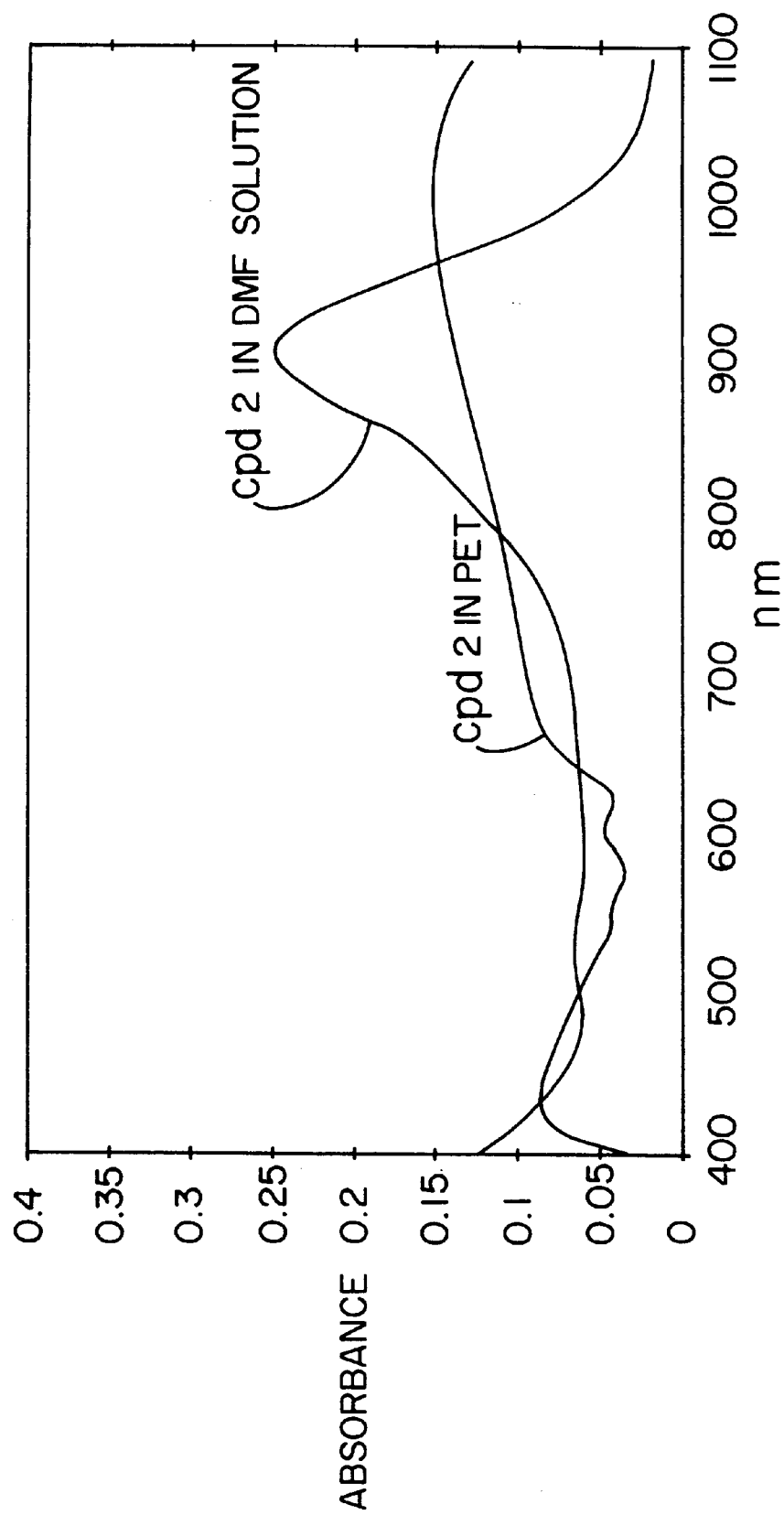
FIG. 10 is the absorbance spectra for compound 10 as measured in DMF solution and PET.
Figure 11:
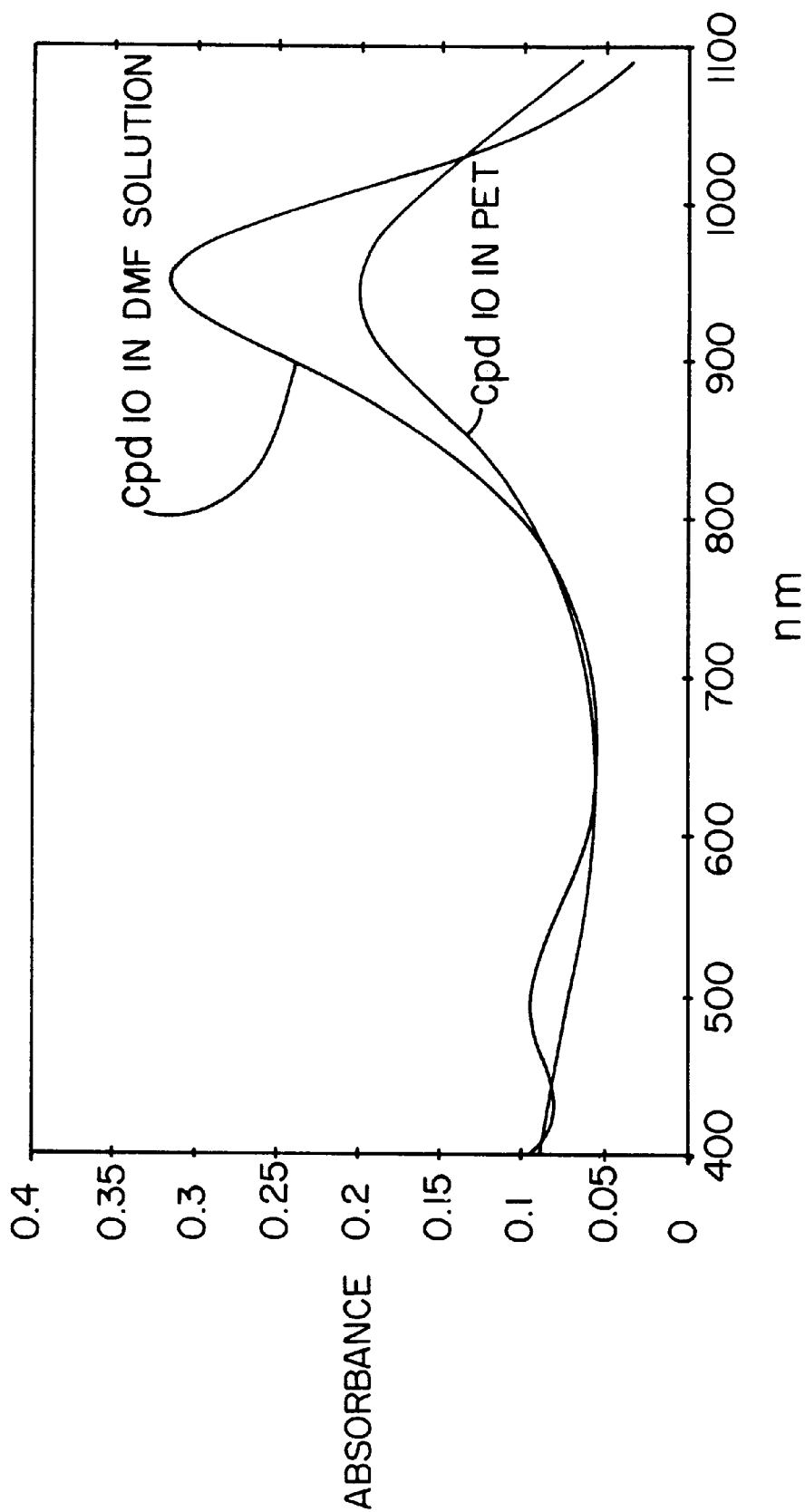
FIG. 11 is the absorbance spectra for compound 1 as measured in DMF solution and PET.

The addition of a dye such as those discussed herein to a polyester resin generally results in a shift of the absorbance maximum to longer wavelengths (bathochromic shift). However, the general shape of the absorbance curve is not changed substantially. There are notable exceptions however, and these can have importance when choosing a reheat compound. FIGS. 9–11 show the absorption curves for compounds 1, 2 and 10 respectively in DMF solution and in PET. Compounds 1 and 10 show little change in their spectra characteristics other than the characteristic bathochromic shift in the maximum absorbance). However, compound 2 shows a dramatic change in absorbance profile when placed in the polymer. The absorbance in the near infrared portion of the spectrum has become much broader and the visible region has developed two strong absorbances leading to a significant decrease in L.* These changes are due to chemical reactions which occur during the polymerization process. The chemical reactions change the nature of the chromophore and result in changes in absorption properties. This is not necessarily thermal degradation. It could be reaction between the polymer and the dye itself. This result underscores the difficulty in finding reheat aids which will increase the reheat rate of the polymer while having little or no effect on the color or transparency of the resin.

Thus, Applicants have surprisingly found that mixtures of organic or metallated organic near infrared absorbing compound(s) or organic or metallated organic near infrared absorbing compound(s) and black or gray body type absorbing compounds display improved reheat characteristics and better clarity than would be expected from looking at the compound spectra alone.

Figure 6:
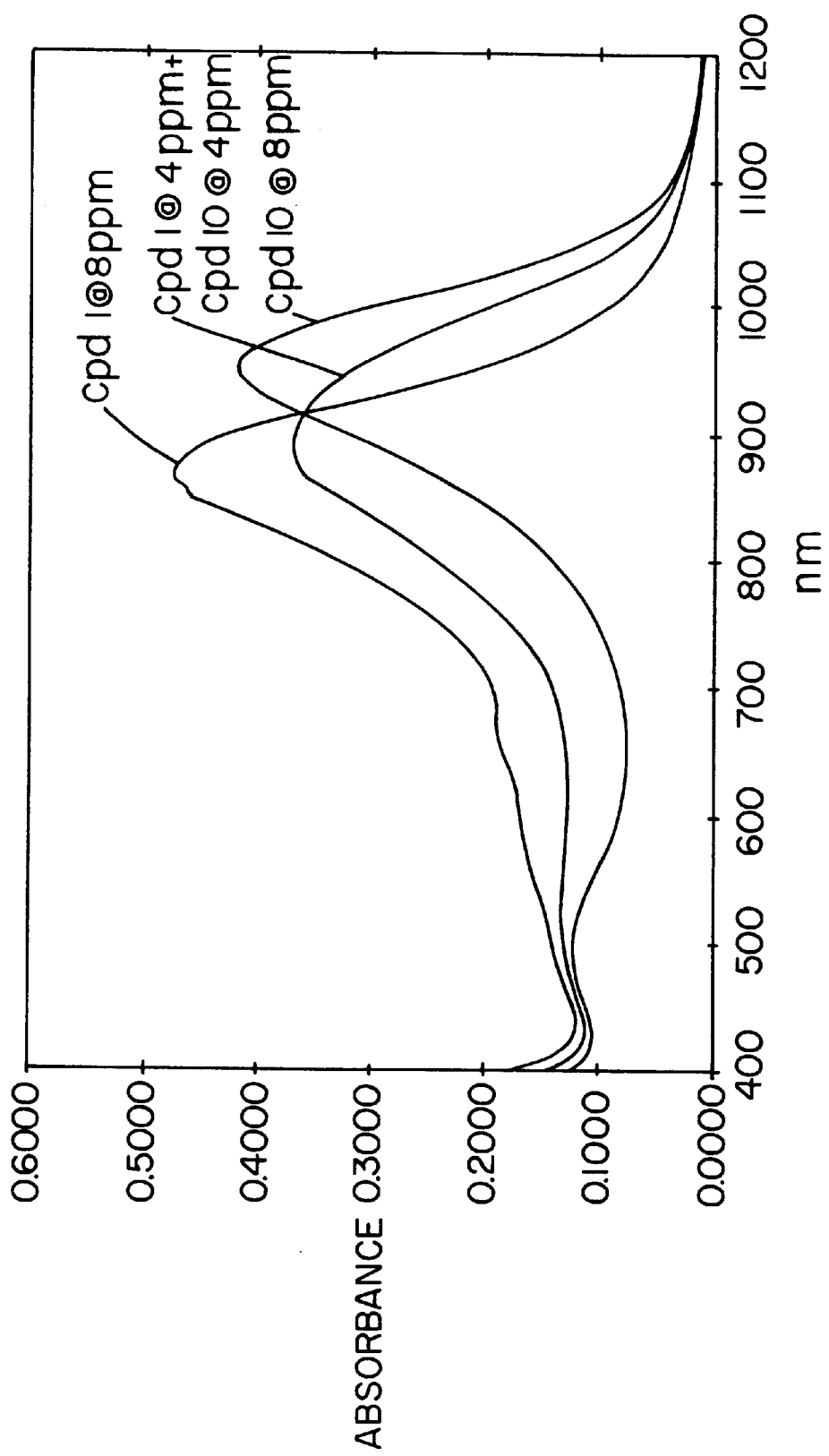
FIG. 6 is the absorbance spectra as measured in solvent individually and combined, for compounds 1 and 10.
Figure 7:
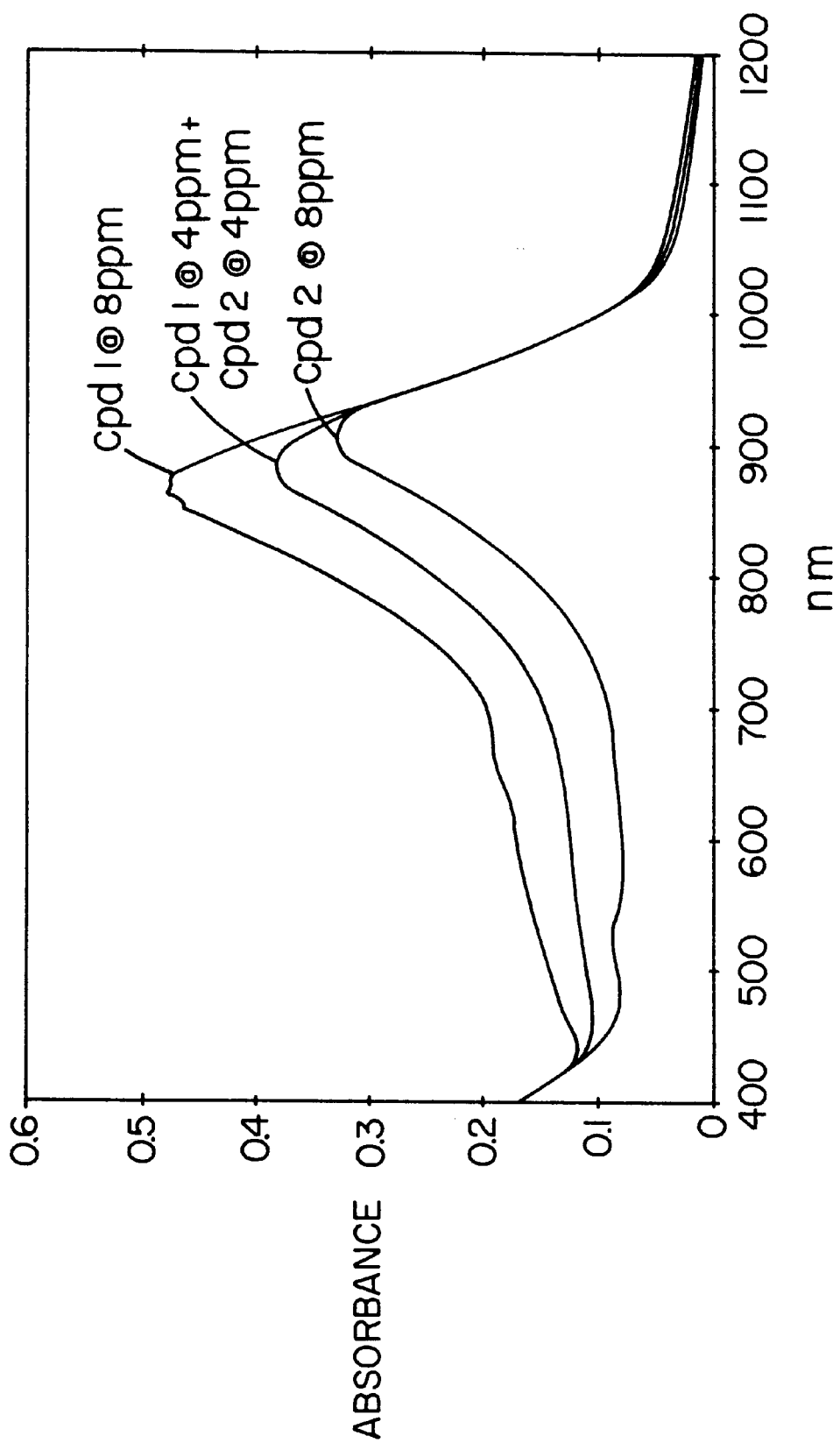
FIG. 7 is the absorbance spectra as measured in solvent individually and combined, for compounds 1 and 2.

Examination of the spectra such as those in FIGS. 6 and 7 can only give an approximation of the effect one would see in the L* values. As mentioned earlier, L* is calibrated to respond as the human eye responds to light. As such, it is more sensitive to changes in some parts of the spectrum than others. It is especially sensitive to the region around 550–650 nm. As a result, small changes in this region of the spectrum can be magnified by the eye thereby giving the impression of a lighter or darker appearance. Moreover, it is well known that the absorption of a compound can shift depending upon the medium it is in.

The polymer component of the present invention is any polymer which is suitable for the production of a stretch blow molded bottle. Examples include polyesters such as polycarbonate, polyethylene terephthalate (PET), polyethylene naphthalate (PEN), copolyesters and blends of PET and PEN. Preferably said polymer is a polyester and more preferably (PET), (PEN) or copolyesters or blends of PET and PEN. The polyethylene terephthalate resin contains repeat units from at least 85 mole percent terephthalic acid and at least 85 mole percent ethylene glycol, while the PEN resin contains repeat units from at least 85 mole percent 2,6-naphthalene-dicarboxlic acid and at least 85% ethylene glycol, based on 100 mole percent dicarboxylic acid and 100 mole percent diol.

The dicarboxylic acid component of the polyester may optionally be modified with up to about 15 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalenedicarboxylic acid (including, but not limited to the 2,6-isomer), cyclohexanedicarboxylic acid, cyclohexanediacetic acid, diphenyl-4,4'-dicarboxylic acid, succinic acid, glutaric acid, adipic acid, azelaic acid, sebacic acid, and the like. Examples of dicarboxlic acids to be included with naphthalene-2,6-dicarboxylic acid are phthalic acid, terephthalic acid, isophthalic acid, other isomers of naphthlenedicarboxylic acid, cyclohexanedicarboxylic acid, cyclohexanediacetic acid, diphenyl-4,4"-dicarboxylic acid, succinic acid, glutaric acid, adipic acid, azelaic acid, sebacic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the polyester component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,2-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxy-cyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The polyethylene terephthalate resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Preferably said PET polyesters comprise at least about 90 mole % terephthalic acid or dimethyl terephthalate and about 90 mole % ethylene glycol residues Polyethylene terephthalate based polyesters of the present invention can be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid state polymerization methods. PEN polyesters may also be prepared by well known polycondensation procedures.

Many other ingredients can be added to the compositions of the present invention to enhance the performance properties of the polyesters. For example, crystallization aids, impact modifiers, surface lubricants, denesting agents, stabilizers, antioxidants, ultraviolet light absorbing agents, metal deactivators, colorants, nucleating agents, fillers and the like can be included. All of these additives and many others and their use are well known in the art and do not require extensive discussion. Therefore, only a limited number will be referred to, it being understood that any of these compounds can be used so long as they do not hinder the present invention from accomplishing its objects. The following examples better illustrate the practice of the invention.

EXAMPLE 1

To 200.79 g of dimethyl terephthalate (DMT), 120 g ethylene glycol (EG), 2.24 g cyclohexanedimethanol (CHDM) and 0.0200 g of Excolor 803K (compound 1) in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 1. This polymer was ground to a coarse powder and dried at 180° C. for 16 hr.

EXAMPLE 2

The sample prepared in Example 1 was melt blended in a Brabender single screw extruder fitted with an Egan mixing screw with Eastman Chemical Co. commercial PET 9921W polymer in a ratio of 1:25 [36 g polymer from Example 1 and 864 g PET 9921W] giving a final concentration of the reheat aid 1 in the sample of 4 ppm. This sample was dried at 150° C. for 16 hr. The dried sample was molded into 3"×3"×150 mil plaques and allowed to cool for 24 hr. before testing as described below.

EXAMPLE 3

The sample prepared in Example 1 was melt blended in a Brabender single screw extruder fitted with an Egan mixing screw with Eastman Chemical Co. commercial PET 9921W polymer in a ratio of 1:12.5 [72 g polymer from Example 1 and 828 g PET 9921W] giving a final concentration of the reheat aid 1 in the sample of 8 ppm. This sample was dried

EXAMPLE 4

To 200.79 g of dimethyl terephthalate (DMT), 120 g ethylene glycol (EG), 2.24 g cyclohexanedimethanol (CHDM) and 0.0200 g of substituted phthalocyanine compound 2 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 2. This polymer was ground to a coarse powder and dried at 180° C. for 16 hr.

EXAMPLE 5

The sample prepared in Example 4 was melt blended in a Brabender single screw extruder fitted with an Egan mixing screw with Eastman Chemical Co. commercial PET 9921W polymer in a ratio of 1:25 [36 g polymer from Example 4 and 864 g PET 9921W] giving a final concentration of the reheat compound 2 in the sample of 4 ppm. This sample was dried at 150° C. for 16 hr. The dried sample was molded into 3"×3"×150 mil plaques and allowed to cool for 24 hr. before testing as described below.

EXAMPLE 6

The sample prepared in Example 4 was melt blended in a Brabender single screw extruder fitted with an Egan mixing screw with Eastman Chemical Co. commercial PET 9921W polymer in a ratio of 1:12.5 [72 g polymer from Example 4 and 828 g PET 9921W] giving a final concentration of the reheat compound 2 in the sample of 8 ppm. This sample was dried at 150° C. for 16 hr. The dried sample was molded into 3"×3"×150 mil plaques and allowed to cool for 24 hr. before testing as described below.

EXAMPLE 7

To 200.79 g of dimethyl terephthalate (DMT), 120 g ethylene glycol (EG), 2.24 g cyclohexanedimethanol (CHDM) and 0.0200 g of octasubstituted phthalocyanine compound 3 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 3. This polymer was ground to a coarse powder and dried at 180° C. for 16 hr.

EXAMPLE 8

The sample prepared in Example 7 was melt blended in a Brabender single screw extruder fitted with an Egan mixing screw with Eastman Chemical Co. commercial PET 9921W polymer in a ratio of 1:25 [36 g polymer from Example 7 and 864 g PET 9921W] giving a final concentration of the reheat compound 3 in the sample of 4 ppm. This sample was dried at 150° C. for 16 hr. The dried sample was molded into 3"×3"×150 mil plaques and allowed to cool for 24 hr. before testing as described below.

EXAMPLE 9

The sample prepared in Example 7 was melt blended in a Brabender single screw extruder fitted with an Egan mixing screw with Eastman Chemical Co. commercial PET 9921W polymer in a ratio of 1:12.5 [72 g polymer from Example 7 and 828 g PET 9921W] giving a final concentration of the reheat compound 3 in the sample of 8 ppm. This sample was dried at 150° C. for 16 hr. The dried sample was molded into 3"×3"×150 mil plaques and allowed to cool for 24 hr. before testing as described below.

EXAMPLE 10

To 200.79 g of dimethyl terephthalate (DMT), 120 g ethylene glycol (EG), 2.24 g cyclohexanedimethanol (CHDM) and 0.0200 g of octasubstituted phthalocyanine compound 4 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 4. This polymer was ground to a coarse powder and dried at 180° C. for 16 hr.

EXAMPLE 11

The sample prepared in Example 10 was melt blended in a Brabender single screw extruder fitted with an Egan mixing screw with Eastman Chemical Co. commercial PET 9921W polymer in a ratio of 1:25 [36 g polymer from Example 10 and 864 g PET 9921W] giving a final concentration of the reheat compound 4 in the sample of 4 ppm. This sample was dried at 150° C. for 16 hr. The dried sample was molded into 3"×3"×150 mil plaques and allowed to cool for 24 hr. before testing as described below.

EXAMPLE 12

The sample prepared in Example 10 was melt blended in a Brabender single screw extruder fitted with an Egan mixing screw with Eastman Chemical Co. commercial PET 9921W polymer in a ratio of 1:12.5 [72 g polymer from Example 10 and 828 g PET 9921W] giving a final concentration of the reheat compound 4 in the sample of 8 ppm. This sample was dried at 150° C. for 16 hr. The dried sample was molded into 3"×3"×150 mil plaques and allowed to cool for 24 hr. before testing as described below.

EXAMPLE 13

To 200.79 g of dimethyl terephthalate (DMT), 120 g ethylene glycol (EG), 2.24 g cyclohexanedimethanol (CHDM) and 0.0200 g of octasubstituted phthalocyanine compound 5 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 3. This polymer was ground to a coarse powder and dried at 180° C. for 16 hr.

EXAMPLE 14

The sample prepared in Example 13 was melt blended in a Brabender single screw extruder fitted with an Egan mixing screw with Eastman Chemical Co. commercial PET 9921W polymer in a ratio of 1:25 [72 g polymer from Example 13 and 864 g PET 9921W] giving a final concentration of the reheat compound 5 in the sample of 4 ppm. This sample was dried at 150° C. for 16 hr. The dried sample was molded into 3"×3"×150 mil plaques and allowed to cool for 24 hr. before testing as described below.

EXAMPLE 15

The sample prepared in Example 13 was melt blended in a Brabender single screw extruder fitted with an Egan mixing screw with Eastman Chemical Co. commercial PET 9921W polymer in a ratio of 1:12.5 [72 g polymer from Example 13 and 828 g PET 9921W] giving a final concentration of the reheat compound 5 in the sample of 8 ppm. This sample was dried at 150° C. for 16 hr. The dried sample was molded into 3"×3"×150 mil plaques and allowed to cool for 24 hr. before testing as described below.

EXAMPLE 16

To 200.79 g of dimethyl terephthalate (DMT), 120 g ethylene glycol (EG), 2.24 g cyclohexanedimethanol (CHDM) and 0.0200 g of octasubstituted phthalocyanine compound 6 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 6. This polymer was ground to a coarse powder and dried at 180° C. for 16 hr.

EXAMPLE 17

The sample prepared in Example 16 was melt blended in a Brabender single screw extruder fitted with an Egan mixing screw with Eastman Chemical Co. commercial PET 9921W polymer in a ratio of 1:25 [36 g polymer from Example 16 and 864 g PET 9921W] giving a final concentration of the reheat aid 6 in the sample of 4 ppm. This sample was dried at 150° C. for 16 hr. The dried sample was molded into 3"×3"×150 mil plaques and allowed to cool for 24 hr. before testing as described below.

EXAMPLE 18

The sample prepared in Example 16 was melt blended in a Brabender single screw extruder fitted with an Egan mixing screw with Eastman Chemical Co. commercial PET 9921W polyester in a ratio of 1:12.5 [72 g polymer from Example 16 and 828 g PET 9921W] giving a final concentration of the reheat aid 6 in the sample of 8 ppm. This sample was dried at 150° C. for 16 hr. The dried sample was molded into 3"×3"×150 mil plaques and allowed to cool for 24 hr. before testing as described below.

EXAMPLE 19

To 200.79 g of dimethyl terephthalate (DMT), 120 g ethylene glycol (EG), 2.24 g cyclohexanedimethanol (CHDM) and 0.0200 g of anthraquinone compound 7 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 7. This polymer was ground to a coarse powder and dried at 180° C. for 16 hr.

EXAMPLE 20

The sample prepared in Example 19 was melt blended in a Brabender single screw extruder fitted with an Egan mixing screw with Eastman Chemical Co. commercial PET 9921W polyester in a ratio of 1:25 [36 g polymer from Example 19 and 864 g PET 9921W] giving a final concentration of the reheat compound 7 in the sample of 4 ppm. This sample was dried at 150° C. for 16 hr. The dried sample was molded into 3"×3"×150 mil plaques and allowed to cool for 24 hr. before testing as described below.

EXAMPLE 21

The sample prepared in Example 19 was melt blended in a Brabender single screw extruder fitted with an Egan mixing screw with Eastman Chemical Co. commercial PET 9921W polyester in a ratio of 1:12.5 [72 g polymer from Example 19 and 828 g PET 9921W] giving a final concentration of the reheat compound 7 in the sample of 8 ppm. This sample was dried at 150° C. for 16 hr. The dried sample was molded into 3"×3"×150 mil plaques and allowed to cool for 24 hr. before testing as described below.

EXAMPLE 22

To 200.79 g of dimethyl terephthalate (DMT), 120 g ethylene glycol (EG), 2.24 g cyclohexanedimethanol (CHDM) and 0.0200 g of anthraquinone compound 8 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 8. This polymer was ground to a coarse powder and dried at 180° C. for 16 hr.

EXAMPLE 23

The sample prepared in Example 22 was melt blended in a Brabender single screw extruder fitted with an Egan mixing screw with Eastman Chemical Co. commercial PET 9921W polyester in a ratio of 1:25 [36 g polymer from Example 22 and 864 g PET 9921W] giving a final concentration of the reheat compound 8 in the sample of 4 ppm. This sample was dried at 150° C. for 16 hr. The dried sample was molded into 3"×3"×150 mil plaques and allowed to cool for 24 hr. before testing as described below.

EXAMPLE 24

The sample prepared in Example 22 was melt blended in a Brabender single screw extruder fitted with an Egan mixing screw with Eastman Chemical Co. commercial PET 9921W polymer in a ratio of 1:12.5 [72 g polymer from Example 22 and 828 g PET 9921W] giving a final concentration of the reheat compound 8 in the sample of 8 ppm. This sample was dried at 150° C. for 16 hr. The dried sample was molded into 3"×3"×150 mil plaques and allowed to cool for 24 hr. before testing as described below.

EXAMPLE 25

To 200.79 g of dimethyl terephthalate (DMT), 120 g ethylene glycol (EG), 2.24 g cyclohexanedimethanol (CHDM) and 0.0200 g of Excolor 901B phthalocyanine compound 10 in a 500 mL round bottom, single neck flask was added 75 ppm Mn, 200 ppm Sb, and 20 ppm Ti as catalyst. This mixture was heated with stirring under nitrogen purge to 190° C. and stirred for 1 hr. The temperature was increased to 220° C. and stirring was continued for 1 hr. The temperature of the flask was increased further to 280° C. and held as the pressure was reduced in stages to 0.5 mm Hg. Reaction was continued for 35–40 min under vacuum. The pressure was increased to atmospheric pressure and the polymer was removed from the heat to give 200 g of a reheat concentrate containing 100 ppm of the reheat aid 10. This polymer was ground to a coarse powder and dried at 180° C. for 16 hr.

EXAMPLE 26

The sample prepared in Example 25 was melt blended in a Brabender single screw extruder fitted with an Egan mixing screw with Eastman Chemical Co. commercial PET 9921W polyester in a ratio of 1:25 [36 g polymer from Example 25 and 864 g PET 9921W] giving a final concentration of the reheat compound 10 in the sample of 4 ppm. This sample was dried at 150° C. for 16 hr. The dried sample was molded into 3"×3"×150 mil plaques and allowed to cool for 24 hr. before testing as described below.

EXAMPLE 27

The sample prepared in Example 25 was melt blended in a Brabender single screw extruder fitted with an Egan mixing screw with Eastman Chemical Co. commercial PET 9921W polymer in a ratio of 1:12.5 [72 g polymer from Example 25 and 828 g PET 9921W] giving a final concentration of the reheat compound 10 in the sample of 8 ppm. This sample was dried at 150° C. for 16 hr. The dried sample was molded into 3"×3"×150 mil plaques and allowed to cool for 24 hr. before testing as described below.

EXAMPLE 28

Material from Example 1, material from Example 4 and PET 9921W commercial polyester was melt blended in a Brabender single screw extruder fitted with an Egan mixing screw at a ratio of 1:1:25 respectively [36 g polymer from Example 1, 36 g polymer from Example 4 and 828 g PET 9921W] giving a final concentration of the 4 ppm reheat aid 1 and 4 ppm reheat aid 2 in the sample of 8 ppm. This sample was dried at 150° C. for 16 hr. The dried sample was molded into 3"×3"×150 mil plaques and allowed to cool for 24 hr. before testing as described below.

EXAMPLE 29

Material from Example 1, material from Example 25 and PET 9921W commercial polyester was melt blended in a Brabender single screw extruder fitted with an Egan mixing screw at a ratio of 1:1:25 respectively [36 g polymer from Example 1, 36 g polymer from Example 25 and 828 g PET 9921W] giving a final concentration of the 4 ppm reheat aid 1 and 4 ppm reheat aid 10 in the sample of 8 ppm. This sample was dried at 150° C. for 16 hr. The dried sample was molded into 3"×3"×150 mil plaques and allowed to cool for 24 hr. before testing as described below.

Testing

To test the reheat rate of the samples, the front side of the molded plaques are heated in front of a quartz lamp for 35 secs. The temperature of the back side of the plaque is then measured as a function of time. The maximum temperature attained by the back side of the plaque is a function of a) the temperature of the lamp; b) the distance from the lamp to the plaque; c) the length of exposure; d) the thickness of the plaques; and e) the reheat characteristics of the polymer. Factors a), b), and c) are held constant. Factor d) is measured and used to compensate for differences in thickness. Factor e) is the desired information. The total increase in temperature $\Delta T$ for the plaque is recorded and adjusted for the thickness of the plaque. The $\Delta T$ could be compared directly among samples, however, we have found that running a set of standard plaques and calculating a ratio of the $\Delta T$'s gives a more precise index of reheat behavior. The values reported in Tables 2 & 3 are given as % improvement over appropriate control samples. This gives a clear indication of the degree of improvement found with a given dye.

Figure 5:
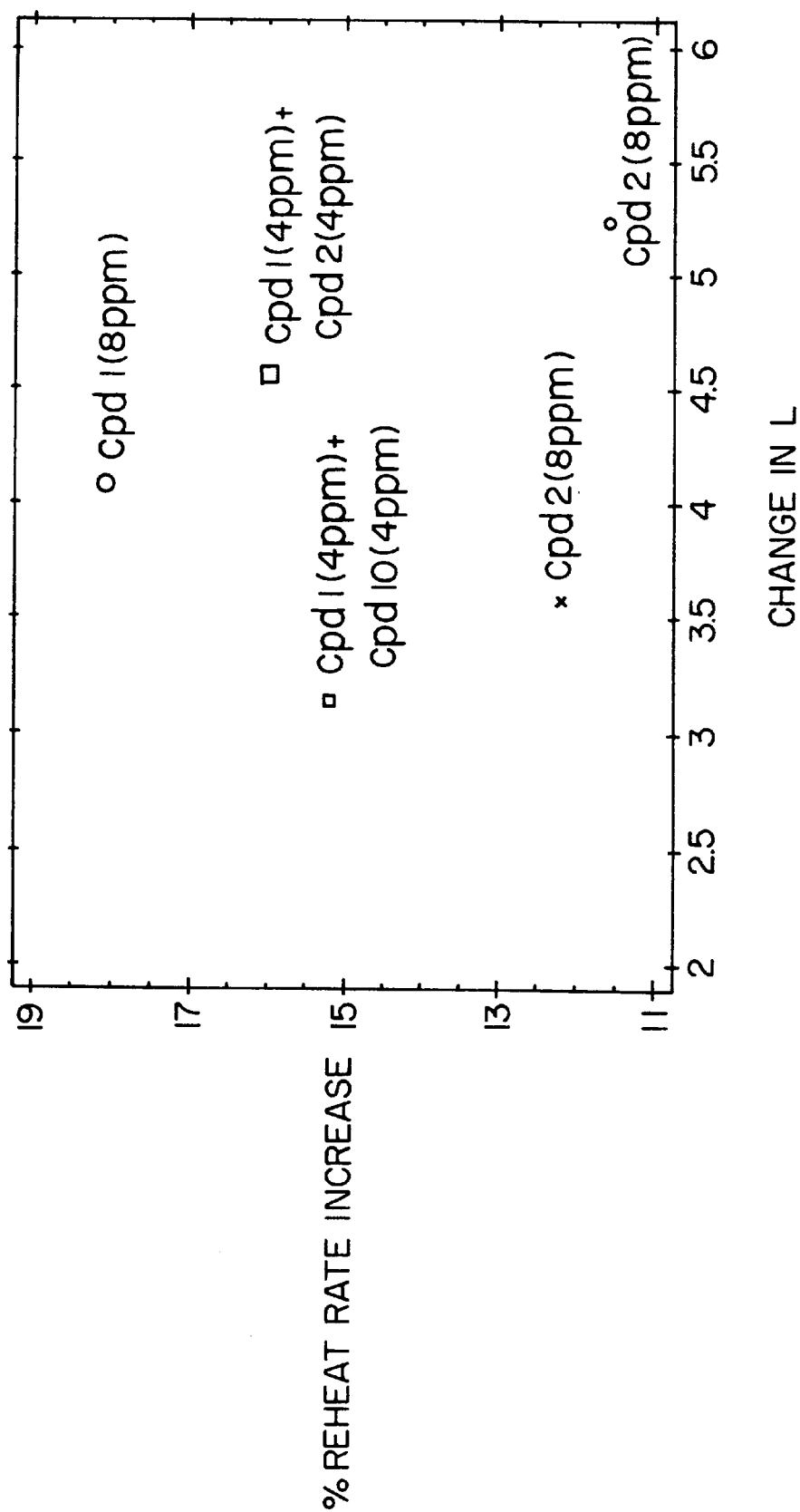
FIG. 5 is a graph showing the % reheat rate increase and change in L* for 2 mixtures of organic near infrared absorbing compounds at 4 ppm of each component and the % reheat rate increase and change in L* for the single compounds used to make the mixtures.

The results for Examples 28 and 29 are given in Table 3 and shown in FIG. 5.

TABLE 3

| Reheat Aids | % Increase in Reheat Rate | $\Delta L^*$† |
|---|---|---|
| 4 ppm 1 & 4 ppm 2 | 16 | 4.57 |
| 4 ppm 1 & 4 ppm 10 | 15 | 3.14 |

In both cases, the percentage reheat rate improvement lay between the improvement seen by using 8 ppm of the least effective of the pair and the improvement seen by using the most effective of the pair as expected. However, in the first case, the change in L* for the mixture is actually worse than for either of the two reheat aids at the 8 ppm level. In the second case, the change in L* is much better than either of the two reheat aids at the 8 ppm level. This result demonstrates the synergy which is possible if the two aids are chosen such that their absorbances are complementary. In the first case, the two reheat aids add to give an overall improvement in the NIR region, but the visible region is increased proportionately (see FIGS. 9 & 10). Due to the changes in the absorbance spectrum of Cpd 2 in PET, it now has a strong absorbance between 650 & 700 nm as does Cpd 1. It is the addition of these absorbances which leads to the dramatic decrease in L*. However, in the second case (see FIGS. 9 & 11), the reheat aids have a more complimentary absorbance spectrum in the visible region. Compound 10 has a moderate absorbance at 500 nm where the absorbance of compound 1 is weak, but has a very weak absorbance in the 600–700 nm region where the absorbance of compound 1 is strong. When added together, the overall increase in absorbance in this region is less than would be expected by doubling either of the aids themselves.

We claim:

1. A container preform comprising: a polymer suitable for the production of a stretch blow molded bottle and at least one organic or metallated organic near infrared absorbing compound which absorbs at least twice as much light between about 700 nm and about 1200 nm as between about 400 nm and about 700 nm wherein said near infrared absorbing compound is present in an amount sufficient to improve reheat rate of said preform without imparting visible color to a container formed from said preform.

2. The preform of claim 1 wherein said near infrared absorbing compound does not have any strong absorbance peaks between about 400 nm and about 700 nm.

3. The preform in claim 2 wherein said near infrared absorbing compound displays an adjusted absorbance maximum of about 0.4 to about 0.5 absorbance units between about 700 nm and about 1200 nm and no absorbance greater than about 0.2 absorbance units between about 400 nm to about 700 nm.

4. The preform of claim 3 wherein said near infrared absorbing compounds have no absorbance between about 400 nm and 700 nm which is greater than about 0.15 absorbance units.

5. The preform of claim 1 wherein said near infrared absorbing compounds also comprise a molar extinction coefficient ($\epsilon$) greater than about 25000 L/(mol cm).

6. The preform of claim 5 wherein said molar extinction coefficient is greater than about 50000 L/(mol cm).

7. The preform of claim 1 wherein said preform displays improved reheat and an L* as measured in a 3"×3"×0.15" molded plaque which is not more than 4 units less than a plaque containing no near infrared absorbing compound.

8. The preform of claim 7 wherein said L* is not reduced by more than about 3 units and said reheat is improved by about 10%.

9. The preform of claim 7 wherein said L* is not reduced by more than about 2 units and said reheat is improved by about 10%.

10. The preform of claim 1 wherein said near infrared absorbing compound is selected from the group consisting of phthalocyanines, 2,3-napthalocyanines, squaraines (squaric acid derivatives), croconic acid derivatives, substituted indanthrones and highly substituted anthraquinones which correspond to Formulae I, II, III, IV, V, and VIa & b respectively:

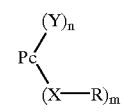

I

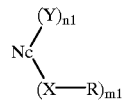

II

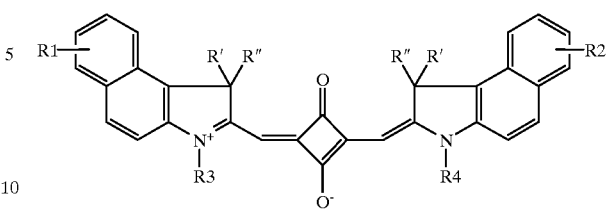

wherein Pc and Nc represent the phthalocyanine and naphthalocyanine moeities represented by Formulae Ia and IIa

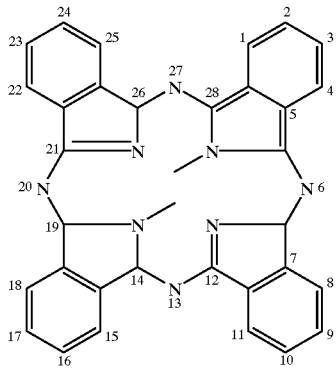

Formula Ia

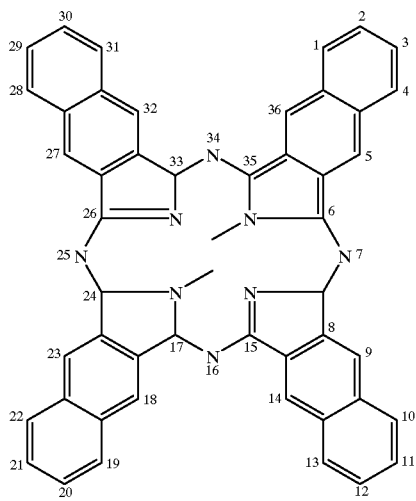

Formula IIa wherein said phthalocyanine and naphthalocyanine compounds are respectively, covalently bonded to a moiety selected from the group consisting of hydrogen, halometals, organometallic groups, and oxymetals;

wherein Y may be the same or different and is selected from alkyl, aryl, heteroaryl, halogen or hydrogen;

X may be the same or different and is selected from oxygen, sulfur, selenium, tellurium or a group of the formula N—$R_{10}$, wherein $R_{10}$ is hydrogen, cycloalkyl, alkyl, alkanoyloxy, alkylsulfonyl, or aryl or $R_{10}$ and R taken together form an aliphatic or aromatic ring with the nitrogen atom to which they are attached;

R is selected from hydrogen, alkyl, alkenyl, alkynyl, cycloalkyl, aryl, heteroaryl, alkylene

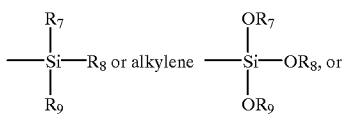

—(X—R)$_m$ or —(X—R)$_{m1}$ is one or more groups selected from alkylsulfonylamino, arylsulfonylamino, or a group selected from the formulae —X($C_2H_4O)_z$R,

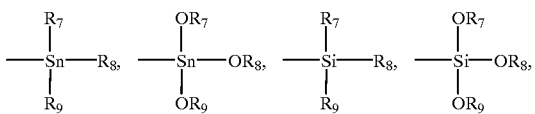

wherein R is as defined above; Z is an integer of from 1–4; or two —(X—R)$_m$ or —(X—R)$_{m1}$ groups can be taken together to form divalent substituents of the formula

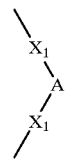

wherein each $X_1$ is independently selected from —O—, —S—, or —N—$R_{10}$ and A is selected from ethylene; propylene; trimethylene; and such groups substituted with lower alkyl, lower alkoxy, aryl and cycloalkyl; 1,2-phenylene and 1,2-phenylene containing 1–3 substituents selected from lower alkyl, lower alkoxy or halogen; R' and R" are independently selected from lower alkyl and cycloalkyl;

wherein substituents $R_1$ and $R_2$ on said squaric acid or croconic acid are independently selected from hydrogen, alkyl, alkoxy, halogen, aryloxy, alkylthio, arylthio, alkylsulfonyl, arylsulfonyl, alkylsulfonylamino, arylsulfonylamino, cycloalkylsulfonylamino, unsubstituted and substituted carbamoyl and sulfamoyl, alkoxycarbonyl, cycloalkoxycarbonyl, alkanoyloxy,

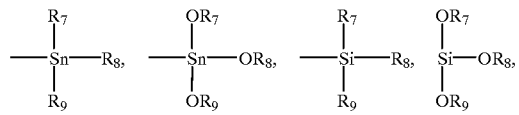

$R_3$ and $R_4$ are independently selected from hydrogen, lower alkyl, alkenyl or aryl; n is an integer from 0–16; $n_1$ is an integer from 0–24, m is an integer from 0–16; $m_1$ is an integer from 0–24; provided that the sums of n+m and $n_1+m_1$ are 16 and 24, respectively;

$R_{14}$ is independently selected from hydroxy, alkylamino, arylamino, arylthio or alkylthio; $R_{15}$ is selected from hydrogen, alkyl, alkoxy, halogen, aryloxy, alkylthio, arylthio, alkylsulfonyl, arylsulfonyl, alkylamino, arylamino, alkylsulfonylamino, arylsulfonylamino, cycloalkylsulfonylamino, unsubstituted and substituted carbamoyl and sulfamoyl, alkoxycarbonyl, cycloalkoxycarbonyl, alkanoyloxy, carboxy, and carbalkoxy; and $X_2$ is independently selected from O, S, and NH.

11. The preform of claim 10 wherein said near infrared absorbing compound is a phthalocyanine or naphthalocyanine and said moeity is selected from the group consisting of AlCl, AlBr, AlF, AlOR$_5$, AlSR$_5$, SiCl$_2$, SiF$_2$, Si(OR$_6$)$_2$, Si(SR$_6$)$_2$, Zn, Mg, VO, Cu, Ni, Fe, Mg, Mn, Co, Ge, Ge(OR$_6$), Ga, Ca, CrF, InCl, Pb, Pt, Pd, SnCl$_2$, Sn(OR$_6$)$_2$, Si(OR$_6$)$_2$, Sn, or TiO wherein $R_5$ and $R_6$ are selected from hydrogen, alkyl, aryl, heteroaryl, alkanoyl, arylcarbonyl, arylaminocarbonyl, trifluoroacetyl

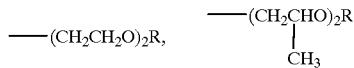

groups of the formula

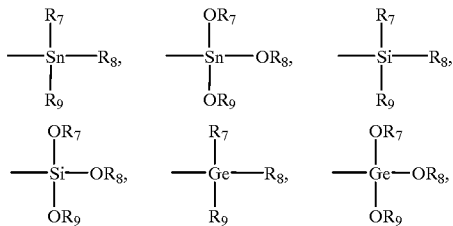

wherein $R_7$, $R_8$ and $R_9$ are independently selected from alkyl, phenyl or phenyl substituted with alkyl, alkoxy or halogen.

12. The preform of claim 11 wherein said moeity is selected from VO, Cu, Ni, Fe, Mg, Mn, Co, Ge, Ge(OR$_6$), Ga, Ca, CrF, InCl, Pb, Pt, Pd, SnCl$_2$, Sn(OR$_6$)$_2$, Si(OR$_6$)$_2$, Sn, or TiO.

13. The preform of claim 11 wherein said moeity is selected from the group consisting of VO, Cu, Ni, Fe and Mg.

14. The preform of claim 11 wherein said near infrared absorbing compound comprises a mixture of phthalocyanine compounds of Formula I, wherein the Y and X—R substituents are attached at positions selected from 2, 3, 9, 10, 16, 17, 23, and 24 positions.

15. The preform of claim 11 wherein said near infrared absorbing compound comprises a mixture of phthalocyanine compounds of Formula I, wherein X is N, R is aryl or alkyl, Y is F, m is 5–8, n is 8–11; and wherein the phthalocyanine moiety is bonded to Cu or V=O at positions 29 and 31.

16. The preform of claim 1 wherein said near infrared absorbing compound comprises at least one second reheat aid selected from the group consisting of black body absorbers, gray body absorbers and metallated or non-metallated organic near infrared absorbing compounds.

17. The preform of claim 16 wherein said near infrared absorbing compound comprises a mixture of at least two metallated or non-metallated organic near infrared absorbing compounds.

18. The preform of claim 17 wherein said at least two near infrared absorbing compounds have complimentary absorbance spectrum in the visible region.

19. The preform of claim 10 wherein said near infrared absorbing compound comprises a mixture of phthalocyanine compounds of Formula I, wherein X is N, R is aryl or alkyl, Y is Cl, m is 5–8, n is 8–11; and wherein the phthalocyanine moiety is bonded to Cu or V=O at positions 29 and 31.

20. The preform of claim 10 wherein said near infrared absorbing compound comprises a mixture of phthalocyanine compounds of Formula I wherein two or more —X—R groups are combined to produce at least one divalent substituent of the formula

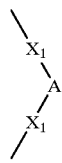

Wherein one $X_1$ represents —N($R_{10}$)— and the other —S—, A is 1,2 phenylene and 1,2 phenylene substituted with carboxy, carbalkoxy, hydroxyalkyl, hydroxyalkoxy, hydroxy alkylthio, carboxyalkyl or carbalkoxyalkyl; Y is Cl, m is 4–8, n is 8–12; and wherein the phthalocyanine moiety is bonded to Cu or V=O at positions 29 and 31.

21. The preform of claim 20 wherein said 1,2-phenylene group is substituted with a substituent selected from the group consisting of hydroxyalkyl, —CO$_2$H, carboxyalkoxyl, hydroxyalkyl, hydroxyalkoxy, hydroalkylthio, carboxyalkyl and carbalkoxyalkyl.

22. The preform of claim 1 wherein said polymer is selected from the group consisting of polyesters and polycarbonate.

23. The preform of claim 17 wherein said polymer is selected from the group consisting of polyesters and polycarbonate.

24. The preform of claim 22 wherein said polymer is a polyester selected from the group consisting of polyethylene terephthalate (PET), polyethylene naphthalate (PEN), copolyesters and blends of PET and PEN.

25. The preform of claim 24 wherein polyester comprises repeat units from a dicarboxylic acid component comprising at least 85 mole percent of a first dicarboxylic acid selected from the group consisting of terephthalic acid, 2,6-naphthalene-dicarboxlic acid or mixtures thereof and a glycol component comprising at least 85 mole percent ethylene glycol based upon 100 mole percent dicarboxylic acid and 100 mole percent diol.

26. The preform of claim 25 wherein said dicarboxylic acid component further comprises up to about 15 mole percent of at least one additional dicarboxylic acid selected from the group consisting of aromatic dicarboxylic acids having 8 to 14 carbon atoms, aliphatic dicarboxylic acids having 4 to 12 carbon atoms, or cycloaliphatic dicarboxylic acids having 8 to 12 carbon atoms.

27. The preform of claim 26 wherein at least one additional dicarboxylic acid is selected from the group consisting of phthalic acid, isophthalic acid, naphthalenedicarboxylic acid (including, but not limited to the 2,6-isomer), cyclohexanedicarboxylic acid, cyclohexanediacetic acid, diphenyl-4,4'-dicarboxylic acid, succinic acid, glutaric acid, adipic acid, azelaic acid, sebacic acid.

28. The preform of claim 25 wherein said glycol component further comprises up to about 15 mole percent, of at least one additional gycol selected from the group consisting of cycloaliphatic diols having 6 to 20 carbon atoms or aliphatic diols having 3 to 20 carbon atoms.

29. The preform of claim 28 wherein said additional glycol is selected from the group consisting of diethylene glycol, triethylene glycol, 1,4-cyclohexanedimethanol, propane-1,3-diol, butane-1,2-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and mixtures thereof.

30. A process for improving the reheat rate of a thermoplastic preform comprising the step of incorporating into said thermoplastic at least one organic or metallated organic near infrared absorbing compound which absorbs at least twice as much light between about 700 nm and about 1200 nm as between about 400 nm in an amount which is sufficient to improve said reheat rate.

31. The process of claim 30 wherein said at least one near infrared absorbing compound does not have any strong absorbance peaks between about 400 nm and about 700 nm.

32. The process of claim 31 wherein said near infrared absorbing compound displays an adjusted absorbance maximum of about 0.4 to about 0.5 absorbance units between about 700 nm and about 1200 nm and no absorbance greater than about 0.2 absorbance units between about 400 nm to about 700 nm.

33. The process of claim 32 wherein said near infrared absorbing compounds have no absorbance between about 400 nm and 700 nm which is greater than about 0.15 absorbance units.

34. The process of claim 30 wherein said near infrared absorbing compounds also comprise a molar extinction coefficient ($\epsilon$) greater than about 25000 L/mol.

35. The process of claim 34 wherein said molar extinction coefficient is greater than about 50000 L/mol.

36. The process of claim 30 wherein said preform displays improved reheat and an L* as measured in a 3"×3"×0.15" molded plaque which is not more than 4 units less than a plaque containing no near infrared absorbing compound.

37. The process of claim 36 wherein said L* is not reduced by more than about 3 units and said reheat is improved by about 10%.

38. The process of claim 36 wherein said L* is not reduced by more than about 2 units and said reheat is improved by about 10%.

39. The process of claim 30 wherein said near infrared absorbing compound comprises at least one second reheat aid selected from the group consisting of black body absorbers, gray body absorbers and metallated or non-metallated organic near infrared absorbing compounds.

40. The process of claim 30 wherein said near infrared absorbing compound comprises a mixture of at least two metallated or non-metallated organic near infrared absorbing compounds.

41. The process of claim 40 wherein said at least two near infrared absorbing compounds have complimentary absorbance spectrum in the visible region.

42. The preform of claim 1 wherein the organic near infrared absorber is selected from the classes of squaraines, croconic acid derivarives, substituted croconic acid derivarives, substitutes indanthrones and anthraquinones substituted with nitrogen and sulfur.

* * * * *

UNITED STATES PATENT AND TRADEMARK OFFICE
CERTIFICATE OF CORRECTION

PATENT NO. : 6,197,851 B1
DATED : March 6, 2001
INVENTOR(S) : Maxwell et al.

It is certified that error appears in the above-identified patent and that said Letters Patent is hereby corrected as shown below:

Column 31,
Line 40, "an" should read "a".
Line 40, add the word "brightness" prior to "L*".
Line 53, delete the phrase "highly substituted".

Column 37,
Line 27, "an" should read "a".
Line 27, add the word "brightness" prior to "L*".

Column 38,
Line 24, "substitutes" should read "substituted".

Signed and Sealed this

Seventh Day of August, 2001

*Attest:*

*Attesting Officer*

NICHOLAS P. GODICI
*Acting Director of the United States Patent and Trademark Office*